(12) United States Patent
Nelson et al.

(10) Patent No.: US 10,369,755 B2
(45) Date of Patent: Aug. 6, 2019

(54) HIGH-PERFORMANCE WORKPIECE HEATING SYSTEM AND METHOD

(71) Applicant: The Boeing Company, Chicago, IL (US)

(72) Inventors: Karl M. Nelson, Issauqah, WA (US); Megan Thompson, Summerville, SC (US); William Serencsits, Charleston, SC (US); Tateh Wu, Bellevue, WA (US); Brian Riedel, Summerville, SC (US)

(73) Assignee: The Boeing Company, Chicago, IL (US)

( * ) Notice: Subject to any disclaimer, the term of this patent is extended or adjusted under 35 U.S.C. 154(b) by 144 days.

(21) Appl. No.: 15/716,188

(22) Filed: Sep. 26, 2017

(65) Prior Publication Data

US 2019/0091952 A1 Mar. 28, 2019

(51) Int. Cl.
*B01J 3/04* (2006.01)
*B29C 73/34* (2006.01)
(Continued)

(52) U.S. Cl.
CPC ............ *B29C 73/34* (2013.01); *B29C 35/045* (2013.01); *F26B 21/02* (2013.01); *F26B 25/066* (2013.01);
(Continued)

(58) Field of Classification Search
CPC . B29B 13/024; F27B 5/04; F27B 5/00; F27D 19/00; B01J 3/04; B01J 3/03; B01J 3/008; C21D 9/0043
See application file for complete search history.

(56) References Cited

U.S. PATENT DOCUMENTS

| 3,605,717 | A | | 9/1971 | Sauer | |
|---|---|---|---|---|---|
| 4,235,592 | A | * | 11/1980 | Smith, Jr. | ................ B22F 3/15 219/400 |

(Continued)

FOREIGN PATENT DOCUMENTS

GB 2416326 1/2006

OTHER PUBLICATIONS

Wikipedia, Autoclave description, Retrieved from "https://en.wikipedia.org/w/index.php?title=Autoclave_(industrial)&oldid=775103576" on Jul. 21, 2017.
(Continued)

*Primary Examiner* — Gregory A Wilson

(57) ABSTRACT

A workpiece heating system includes an outer shell configured to receive a mandrel having a mandrel partside configured to support a workpiece. A gas displacement device is configured to discharge a gas toward a mandrel backside. At least one heat exchanger is configured to heat the gas prior to the gas entering the gas displacement device. A hood system is configured to at least partially envelope the mandrel when positioned within the outer shell. A hood first wall and the mandrel backside define a first annular gap configured to receive the gas discharged from the gas displacement device, and direct the gas axial from the mandrel proximal end to the mandrel distal end. A hood second wall and the mandrel partside define a second annular gap configured to receive the gas from the first annular gap and direct the gas axial from the mandrel distal end to the mandrel proximal end.

21 Claims, 21 Drawing Sheets

(51) Int. Cl.
*F27B 17/00* (2006.01)
*F26B 25/06* (2006.01)
*F26B 21/02* (2006.01)
*B29C 35/04* (2006.01)
*B29C 35/02* (2006.01)

(52) U.S. Cl.
CPC ...... *F27B 17/0083* (2013.01); *B29C 35/0227* (2013.01); *B29C 2035/046* (2013.01)

(56) References Cited

U.S. PATENT DOCUMENTS

| | | | |
|---|---|---|---|
| 4,247,755 A * | 1/1981 | Smith, Jr. | B01J 3/04 |
| | | | 219/400 |
| 4,426,792 A | 1/1984 | Best | |
| 4,532,984 A * | 8/1985 | Smith, Jr. | A61L 2/07 |
| | | | 165/61 |
| 4,882,468 A * | 11/1989 | Bouchon | C21D 1/773 |
| | | | 219/400 |
| 4,935,604 A | 6/1990 | Allen et al. | |
| 5,564,473 A | 10/1996 | Schaich et al. | |
| 5,676,044 A | 10/1997 | Lara, Jr. | |
| 6,077,476 A * | 6/2000 | Quinlan | B01J 3/002 |
| | | | 419/25 |
| 7,100,656 B2 | 9/2006 | Lamb et al. | |
| 8,808,646 B2 | 8/2014 | Nelson et al. | |
| 9,056,413 B1 | 6/2015 | Cox | |
| 9,127,888 B2 | 9/2015 | Mason | |
| 9,453,277 B2 * | 9/2016 | Watanabe | C21D 1/06 |
| 2012/0003597 A1 | 1/2012 | Mason | |
| 2012/0039766 A1 | 2/2012 | Storberg | |
| 2015/0069042 A1 * | 3/2015 | Serrago | F27B 17/025 |
| | | | 219/390 |
| 2016/0096289 A1 | 4/2016 | Riedel | |
| 2016/0348969 A1 * | 12/2016 | Katsumata | C21D 1/773 |
| 2016/0348976 A1 | 12/2016 | Nelson | |
| 2017/0073786 A1 * | 3/2017 | Katsumata | F27B 5/08 |

OTHER PUBLICATIONS

Globe, RapidClave brochure, retrieved Jul. 21, 2017.
EPO, Extended European Search Reort, Appl. No. 18195755.6, dated Mar. 14, 2019.

* cited by examiner

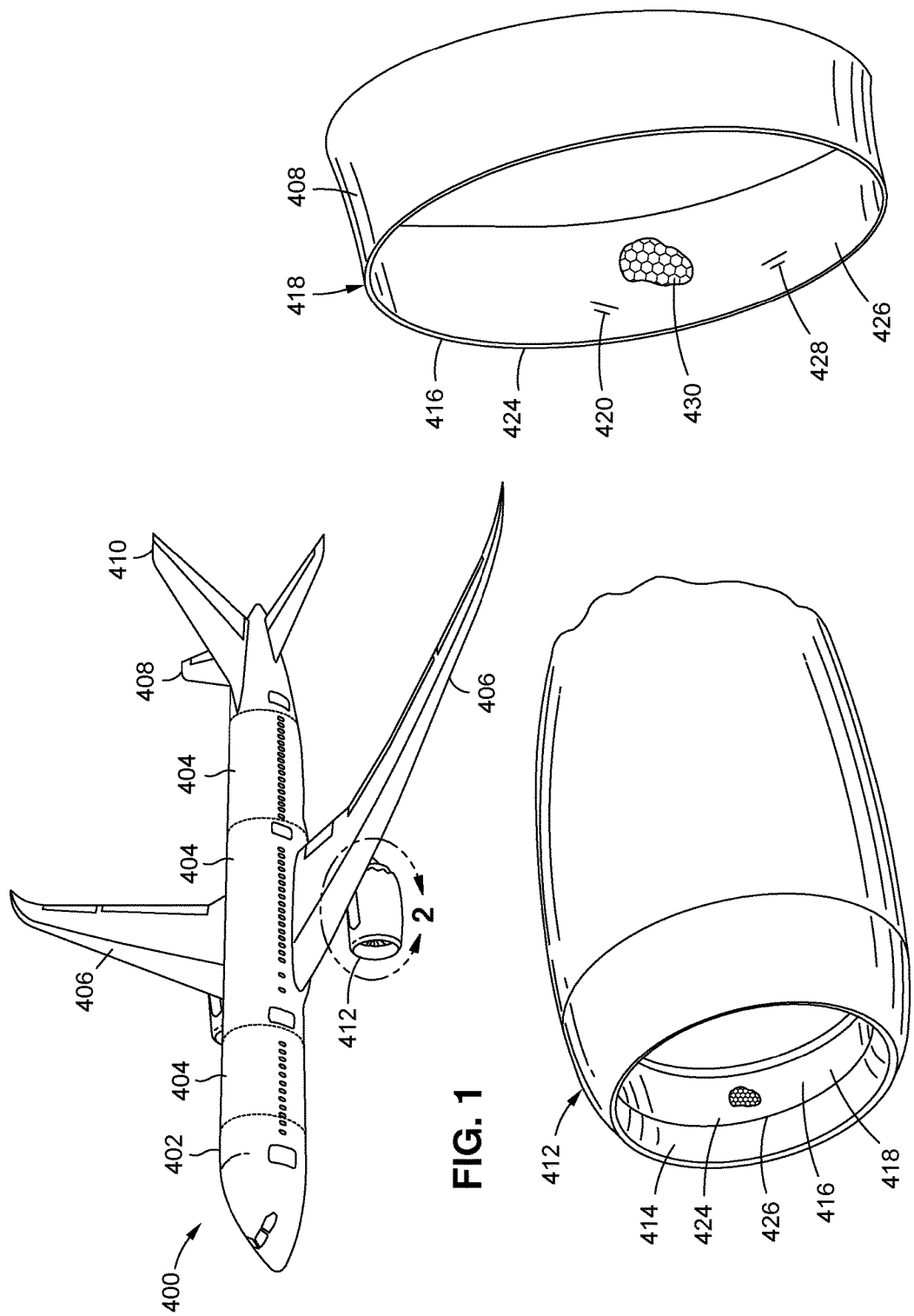

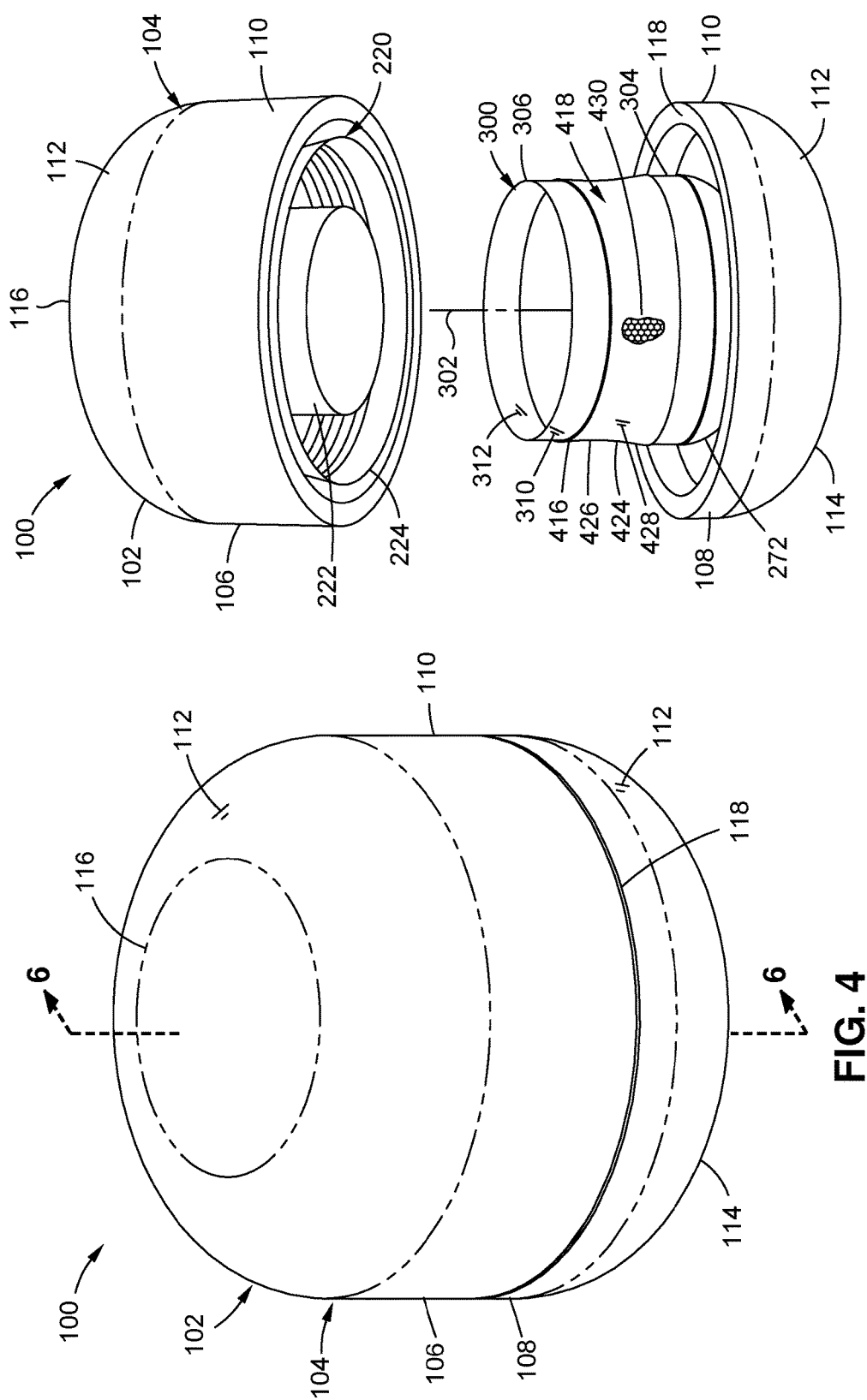

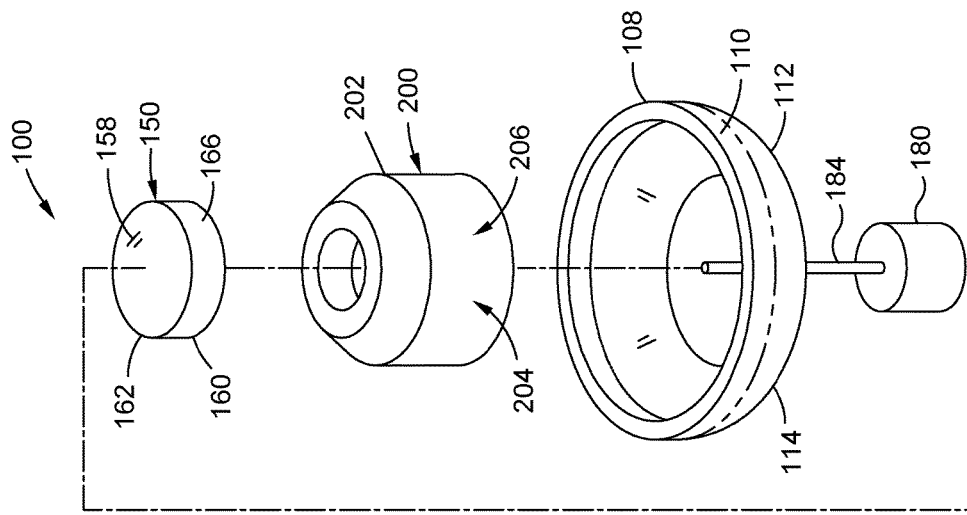
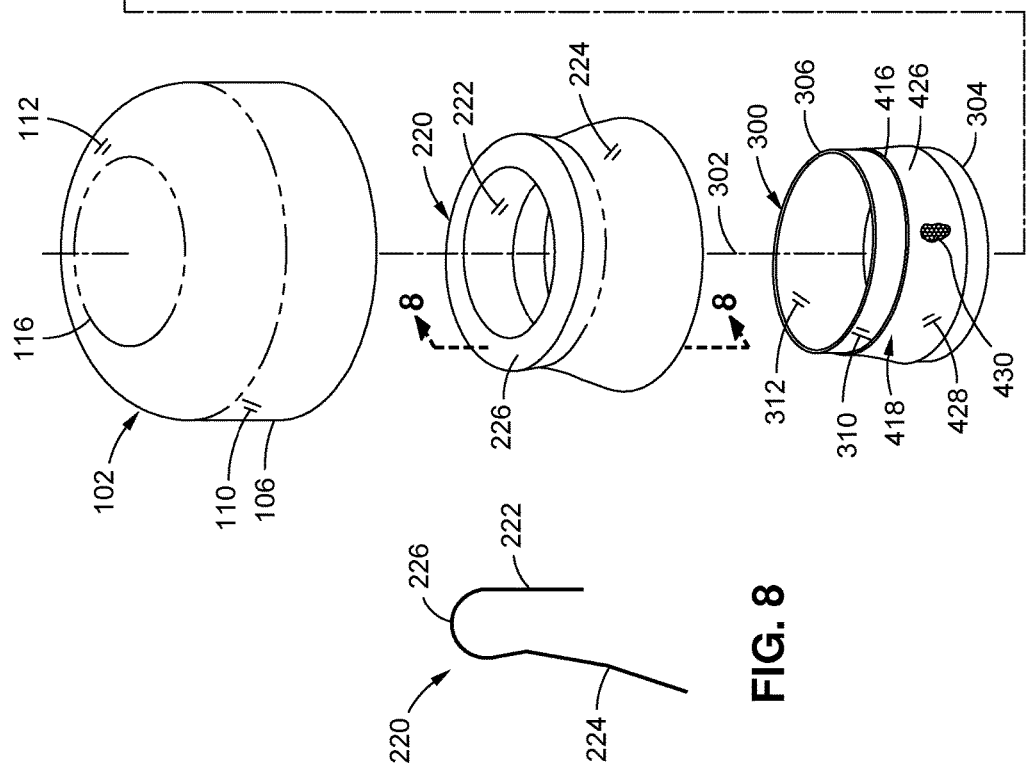
FIG. 7
FIG. 8

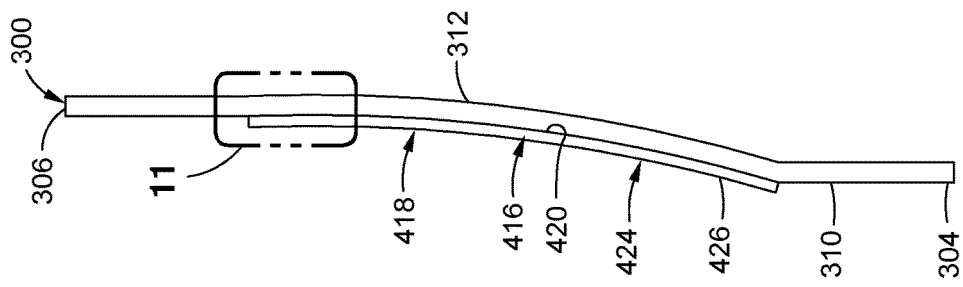
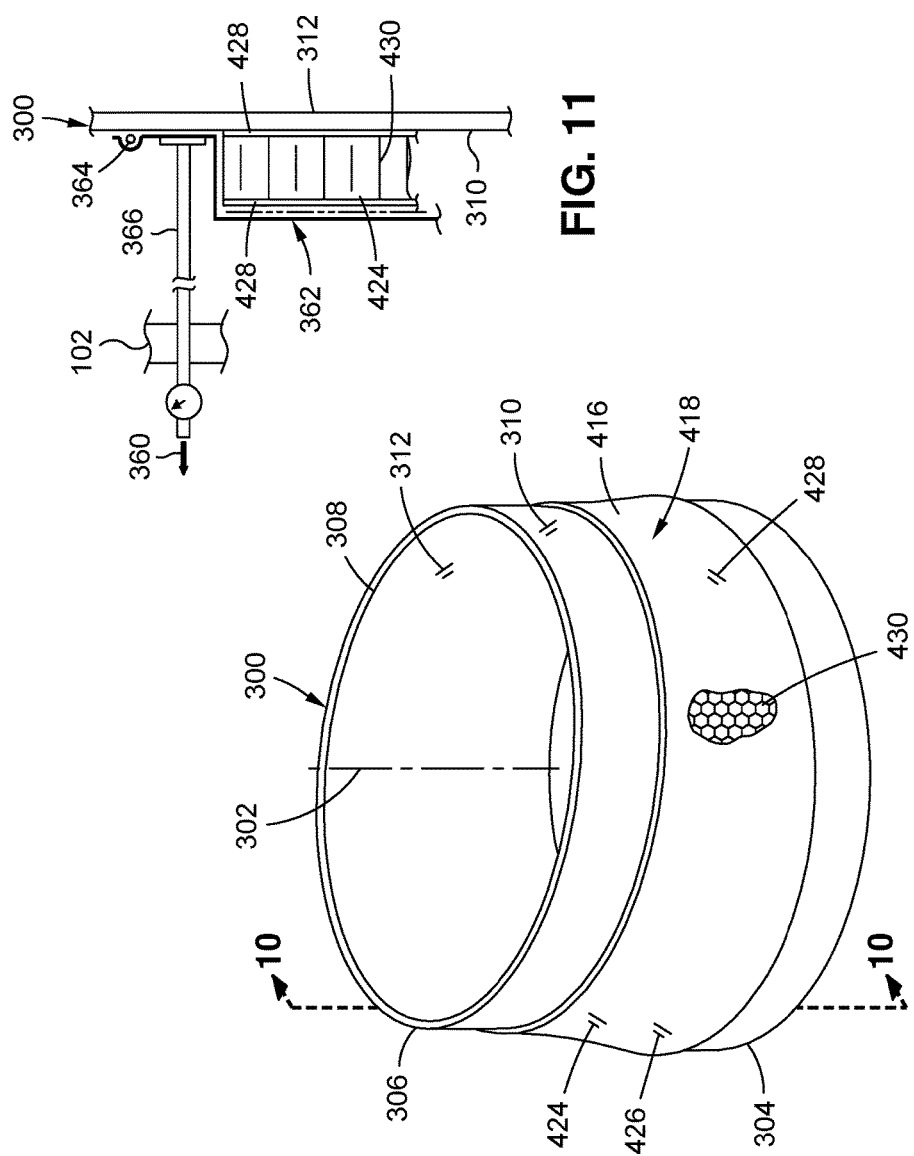

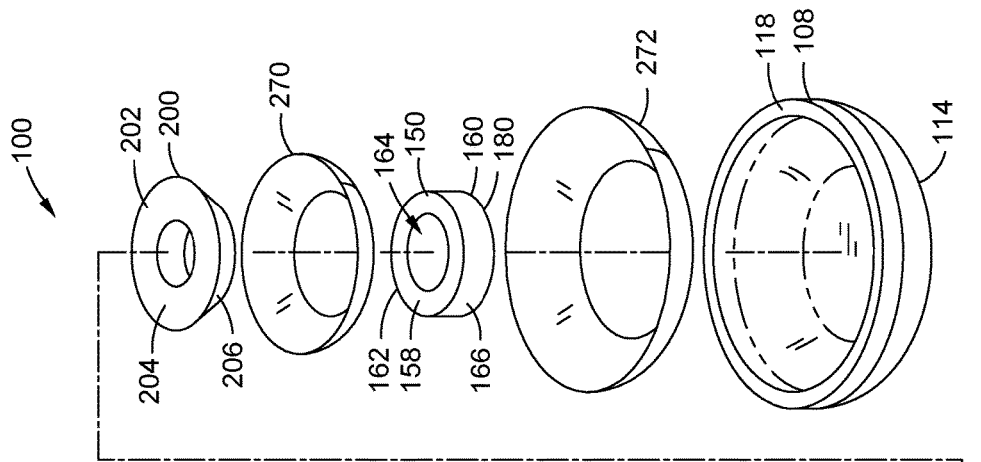
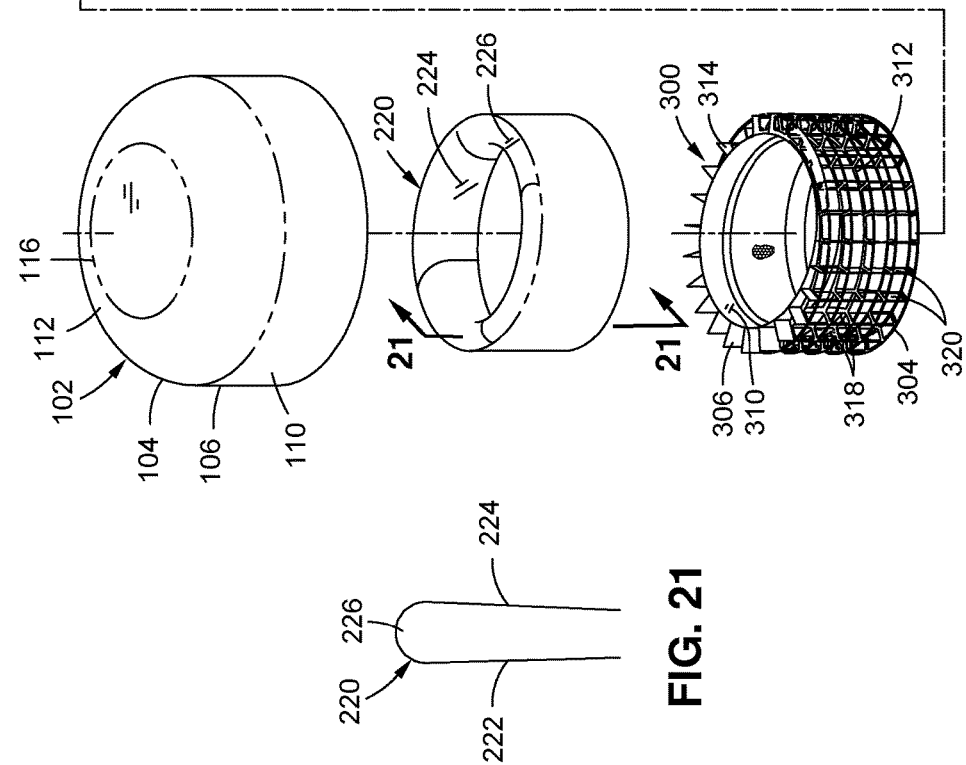
FIG. 20
FIG. 21

HIGH-PERFORMANCE WORKPIECE HEATING SYSTEM AND METHOD

FIELD

The present disclosure relates generally to composites manufacturing and, more particularly, to a system and method for heating a workpiece to facilitate processing (e.g., curing) of the workpiece.

BACKGROUND

Composite parts are increasingly used in a wide variety of applications due to their favorable properties such as high specific strength, high specific stiffness, and high corrosion resistance. The manufacturing of a composite part typically requires the application of heat and pressure for curing the composite part while supported on a mandrel. Conventional methods of curing composite parts use large autoclaves to apply heat and pressure in a controlled manner to maximize the mechanical properties of the cured composite part.

While large autoclaves are generally satisfactory for curing large composite parts, the use of large autoclaves for batch curing of multiple small composite parts can be improved. For example, in a large autoclave loaded with a batch of composite parts, the curing cycle time is controlled by the slowest-heating composite part in the batch. Batch curing cycle times are often long due to the size, shape, and/or thermal mass of the mandrels and composite parts being cured. In addition, the manner in which a large autoclave heats a batch of composite parts may affect the ability to uniformly heat all locations of each composite part to within the relatively narrow temperature ranges required to achieve uniform mechanical properties across each cured composite part.

A further consideration associated with the use of large autoclaves for batch curing of small composite parts is the significant capital investment associated with large autoclaves. For example, large autoclaves are typically fabricated on-site using heavy equipment and specialized installation techniques resulting in high manufacturing and installation costs. In addition, large autoclaves have significant operating and maintenance costs. A production facility typically requires a minimum of two large autoclaves to support the desired production rate such that if one autoclave fails or is removed from service for maintenance, the remaining autoclave can sustain a reasonable production rate. Installing, operating, and maintaining multiple large autoclaves to accommodate batch curing of small composite parts can add significantly to the overall cost of a production program.

SUMMARY

The above-noted considerations associated with curing composite parts are specifically addressed and can be alleviated by the present disclosure, which provides a workpiece heating system for heating a workpiece supported on a mandrel. The workpiece heating system includes an outer shell configured to enclose a mandrel removably positionable within the outer shell. The mandrel has a mandrel proximal end, a mandrel distal end, a mandrel partside configured to support a workpiece, and a mandrel backside opposite the mandrel partside. The workpiece heating system also includes a gas displacement device mounted within the outer shell. The gas displacement device has an outer circumferential exit configured to discharge a gas along a direction toward the mandrel backside. The gas displacement device further includes at least one heat exchanger mounted within the outer shell upstream of the gas displacement device. The heat exchanger is configured to heat the gas prior to entering the gas displacement device. In addition, the gas displacement device includes a hood system having a hood first wall and a hood second wall each configured to extend circumferentially in radially spaced relation to each other and in radially spaced relation respectively to the mandrel backside and the mandrel partside when the mandrel is positioned within the outer shell. The hood first wall and the mandrel backside collectively define a first annular gap configured to receive the gas discharged from the gas displacement device and direct the gas in a generally axial direction along a first flow path segment from the mandrel proximal end to the mandrel distal end. The hood second wall and the mandrel partside collectively define a second annular gap configured to receive the gas from the first annular gap and direct the gas in a generally axial direction along a second flow path segment from the mandrel distal end to the mandrel proximal end.

In a further embodiment, the workpiece heating system includes an outer shell having a first shell portion and a second shell portion configured to be mated along a circumferential shell joint for enclosing a generally cylindrical mandrel removably positionable within the outer shell. As described above, the mandrel has a mandrel proximal end, a mandrel distal end, a mandrel axis, a mandrel partside configured to support a workpiece, and a mandrel backside located radially inboard of the mandrel partside. The workpiece heating system includes a gas displacement device located flush with or below the shell joint. The gas displacement device has an outer circumferential exit configured to discharge a gas radially outwardly such that the gas flows along the mandrel backside. The workpiece heating system also includes a heat exchanger mounted within the outer shell below the gas displacement device. As indicated above, the heat exchanger is configured to heat the gas prior to the gas entering the gas displacement device. The workpiece heating system further includes a hood system having a hood first wall and a hood second wall each configured to extend circumferentially in radially spaced relation to each other and in radially spaced relation respectively to the mandrel backside and the mandrel partside when the mandrel is positioned within the outer shell. As indicated above, the hood first wall and the mandrel backside collectively define a first annular gap configured to receive the gas discharged from the gas displacement device and direct the gas in a generally axial direction along a first flow path segment from the mandrel proximal end to the mandrel distal end. The hood second wall and the mandrel partside collectively define a second annular gap configured to receive the gas from the first annular gap and direct the gas in a generally axial direction along a second flow path segment from the mandrel distal end to the mandrel proximal end.

Also disclosed is a method of heating a workpiece supported on a mandrel. The method includes positioning the mandrel within an outer shell. The mandrel has a mandrel proximal end, a mandrel distal end, and a mandrel axis. In addition, the mandrel includes a mandrel partside supporting a workpiece and having a mandrel backside opposite the mandrel partside. The method also includes heating the gas using at least one heat exchanger mounted within the outer shell. The method additionally includes discharging, using a gas displacement device mounted within the outer shell, the gas from the gas displacement device along a direction toward the mandrel backside. Furthermore, the method includes directing, using a hood first wall of a hood system positioned over the mandrel, the gas from the gas displacement device in a generally axial direction through a first annular gap between the hood first wall and the mandrel backside along a first flow path segment extending from the mandrel proximal end to the mandrel distal end. In addition, the method includes directing, using a hood second wall of the hood system, the gas from the first annular gap in a generally axial direction through a second annular gap between the hood second wall and the mandrel partside along a second flow path segment extending from the mandrel distal end to the mandrel proximal end. The method also includes heating the mandrel in response to directing the gas through the first annular gap and the second annular gap, and heating the workpiece in response to heating the mandrel.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of an aircraft;

FIG. 2 is a perspective view of a turbine engine of the aircraft of FIG. 1 showing an inner barrel section defining an inner wall of an engine nacelle of the turbine engine;

FIG. 3 is a perspective view of the inner barrel section of FIG. 2 configured as a composite part comprising a sandwich structure including a core having face sheets on opposing sides of the core;

FIG. 4 is a perspective view of an example of the presently-disclosed workpiece heating system implemented for curing one or more composite parts, and illustrating an outer shell of the workpiece heating system including a first shell portion (e.g., an upper shell portion) joined to a second shell portion (e.g., a lower shell portion);

FIG. 5 is a perspective view of the workpiece heating system of FIG. 4 showing the first shell portion separated from the second shell portion and illustrating a hood system for at least partially enveloping a workpiece (e.g., an inner barrel section) supported on a mandrel;

FIG. 7 is an exploded perspective view of the workpiece heating system of FIG. 4;

FIG. 8 is a side sectional view of the hood system taken along line 8 of FIG. 7;

FIG. 9 is a perspective view of the mandrel of FIG. 7 and illustrating the workpiece configured as a composite part comprising a sandwich structure having a honeycomb core and opposing face sheets;

FIG. 10 is a side sectional view taken along line 10 of FIG. 9 and illustrating the workpiece supported on the mandrel partside;

FIG. 11 is a partial sectional view of a portion of the upper edge of the workpiece taken along box 11 of FIG. 10 and illustrating a vacuum bag sealed to the mandrel partside and further illustrating a vacuum line extending through the outer shell to a vacuum source for applying a vacuum to the vacuum bag for generating compaction pressure on the workpiece against the mandrel;

FIG. 20 is an exploded perspective view of the workpiece heating system of FIG. 19;

FIG. 21 is a side sectional view of the hood system taken along line 21 of FIG. 20;

DETAILED DESCRIPTION

Figure 6:
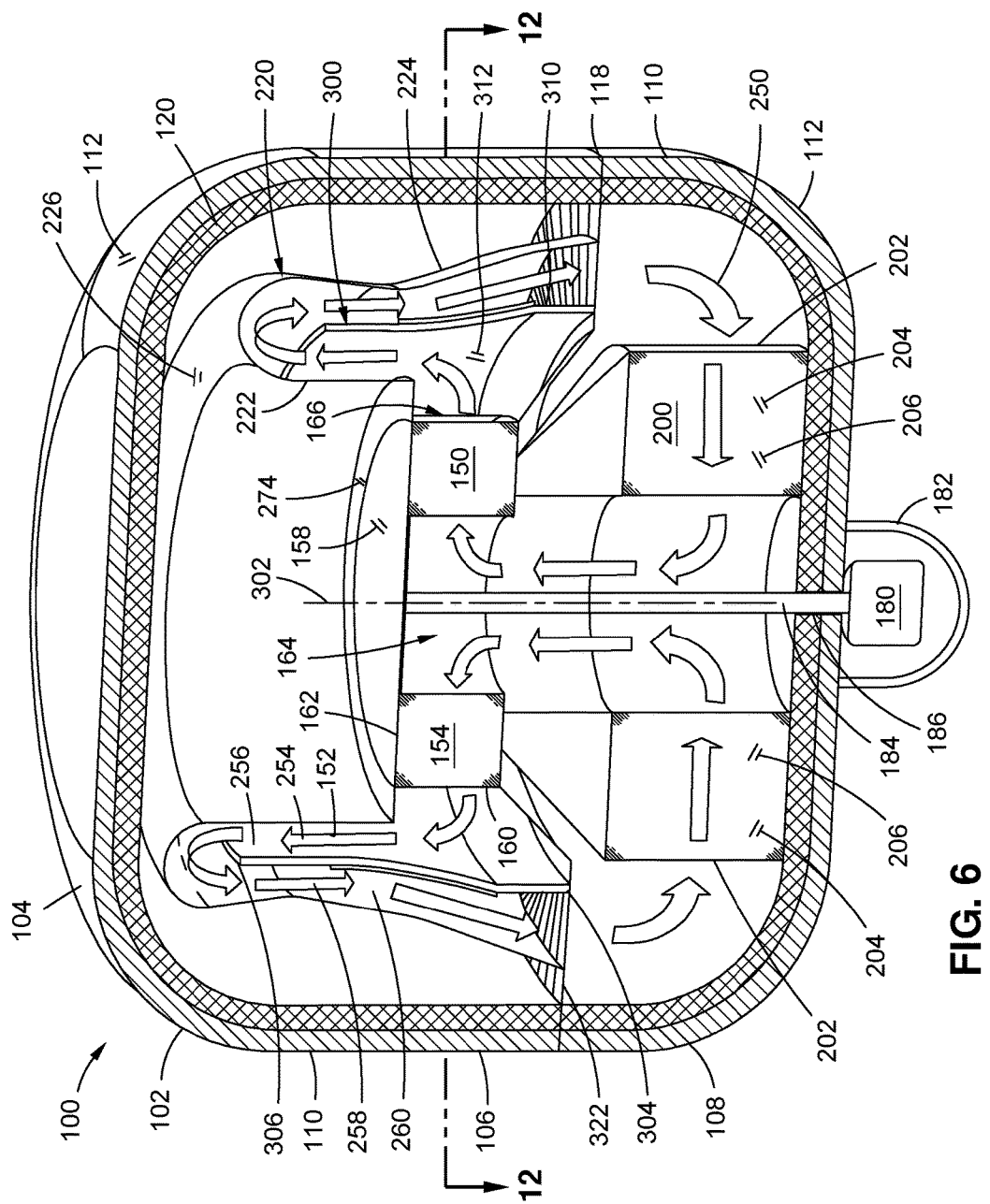
FIG. 6 is a perspective sectional view of the workpiece heating system taken along line 6 of FIG. 4 and illustrating an example of a hood system located in spaced relation to a mandrel and workpiece.

Described herein is a system and method for curing relatively small composite parts to avoid at least some of the considerations associated with batch curing in a large autoclave.

Referring now to the drawings wherein the showings are for purposes of illustrating preferred and various embodiments of the disclosure, shown in FIG. 1 is a perspective view of an aircraft 400 which may include one or more composite parts 424 (e.g., FIG. 3) that may be processed using the presently-disclosed workpiece heating system 100 (e.g., FIG. 6) and method (FIG. 28) described in detail below. The aircraft 400 includes a fuselage 402 extending from a nose to an empennage. The fuselage 402 may be made up of a plurality of fuselage barrel sections 404 joined end to end. The empennage may include one or more tail surfaces such as a vertical tail 410 and a horizontal tail 408. The aircraft 400 may also include a pair of wings 406 extending outwardly from the fuselage 402, and one or more propulsion units such as turbine engines 412 supported by the wings 406.

Referring to FIG. 2, shown is an example of a turbine engine 412 of the aircraft 400 of FIG. 1. The turbine engine 412 includes an engine nacelle 414 having an inner wall that may be defined at least in part by an inner barrel section 416. The inner barrel section 416 may be configured to provide a smooth surface for directing airflow through the turbine engine 412.

The presently-disclosed workpiece heating system 100 (e.g., FIG. 6) and method 500 (FIG. 28) is described in the context of heating a workpiece 418 configured as the inner barrel section 416 while mounted on a mandrel 300 (e.g., FIG. 6) during curing of the inner barrel section 416. However, as indicated above, the workpiece heating system 100 and method 500 may be implemented for heating workpieces 418 of any one of a variety of different sizes, shapes, and configurations, and is not limited to curing an inner barrel section 416. Furthermore, the workpiece heating system 100 and method 500 may be implemented for heating workpieces 418 formed of any one of a variety of different types of materials including workpieces 418 formed of metallic material, non-metallic material, or a combination of metallic material and non-metallic material. In some examples, a workpiece may be a composite part, which may be described as an assembly of components formed of the same or different material.

FIG. 3 shows the inner barrel section 416 configured as a composite part 424 comprising a sandwich structure 426 including a core 430 having face sheets 428 on opposing sides of the core 430. In the example shown, the core 430 has a honeycomb configuration and may be formed of metallic material (e.g., aluminum) or non-metallic material (e.g., Aramid). One or both of the face sheets 428 of the inner barrel section 416 may be formed of a stack of several uncured laminated composite plies of fiber-reinforced polymer matrix material (e.g., prepreg) such as graphite-epoxy prepreg or fiberglass-epoxy prepreg. Alternatively, one or both of the face sheets 428 may be formed of metallic material such as aluminum. The face sheets 428 and core 430 may be laid up on a mandrel 300 (e.g., FIG. 9) with a layer of film adhesive (not shown) between each face sheet 428 and the core 430. The mandrel-mounted sandwich structure 426 may be cured inside the workpiece heating system 100 (e.g., FIG. 6) as described below. Although not shown, a workpiece 418 may comprise a stack of uncured prepreg composite plies with or without additional non-composite-ply layers, and which may be consolidated and/or cured on a mandrel 300 using the presently-disclosed workpiece heating system 100. However, as indicated above, a workpiece 418 may be provided in any configuration, and is not limited to a sandwich structure 426 or a laminate of composite plies.

FIG. 4 is a perspective view of an example of a workpiece heating system 100 as may be implemented for heating a workpiece 418 (FIG. 5) such as during a curing operation. The workpiece heating system 100 has an outer shell 102 configured to contain gas (e.g., heated gas). The outer shell 102 may also function as a pressure vessel for pressurized versions of the workpiece heating system 100, as described below. The outer shell 102 may be provided as a shell assembly 104 of two or more shell portions. In the example shown, the shell assembly 104 includes a first shell portion 106 (e.g., an upper shell portion) and a second shell portion 108 (e.g., a lower shell portion), which may be mated along a circumferential shell joint 118 as described below.

Referring to FIG. 5, shown is a perspective view of the workpiece heating system 100 of FIG. 4 showing the first shell portion 106 separated from the second shell portion 108 to illustrate a hood system 220 configured to be positioned at least partially over a workpiece 418 supported on a mandrel 300. The workpiece heating system 100 additionally includes a gas displacement device 150 (e.g., FIG. 6) and at least one heat exchanger 200 (e.g., FIG. 6) as described below. The heat exchanger(s) 200 may include a heating device 204 for heating the gas 152, and may include a cooling device 206 for cooling the gas 152. The gas displacement device 150 (e.g., FIG. 6) and the heat exchanger(s) 200 may optionally be fixedly mounted to the second shell portion 108 (e.g., the lower shell portion). In FIG. 5, the hood system 220 may be coupled to or supported by the first shell portion 106 (e.g., the upper shell portion) such that the first shell portion 106 and the hood system 220 are movable as a unit. However, the hood system 220 may be a separate component from the first shell portion 106. As described below, the mandrel 300 and workpiece 418 may be positioned relative to the gas displacement device 150 and the heat exchanger(s) 200. The hood system 220 may be installed over the mandrel 300 prior to the mating of the first shell portion 106 to the second shell portion 108 to enclose the mandrel 300 and workpiece 418, gas displacement device 150, and heat exchanger(s) 200.

FIG. 6 is a perspective sectional view of the workpiece heating system 100 of FIG. 5 showing an example of a mandrel 300 and associated workpiece 418, a hood system 220, a gas displacement device 150, and a heat exchanger 200, all of which are shown enclosed by the outer shell 102. The mandrel 300 has a mandrel proximal end 304 and a mandrel distal end 306 and defines a mandrel axis 302 extending between the mandrel proximal end 304 and the mandrel distal end 306. In the present disclosure, a proximal end of a component is the end nearest the lower end of the outer shell 102 or the end of the outer shell 102 containing the gas displacement device 150 and heat exchanger 200. In the present disclosure, the distal end of a component is the end furthest from the lower end of the outer shell 102 or furthest from the end containing the gas displacement device 150 and the heat exchanger 200. In the example shown in FIG. 6, the workpiece heating system 100 is configured to receive the mandrel 300 oriented approximately vertically (e.g., within 30 degrees). However, in other examples, the workpiece heating system 100 may be configured to enclose a mandrel 300 oriented in any one of a variety of orientations. For example, the workpiece heating system 100 shown in FIGS. 24-27 and described below is configured to receive a mandrel 300 oriented approximately horizontally.

In any one of the embodiments disclosed herein, the workpiece heating system 100 may include at least one mandrel support member 322 (e.g., FIGS. 6 and 13) fixedly coupled to the second shell portion 108 (e.g., the lower shell portion) and configured to support the mandrel 300 when positioned within the outer shell 102. In addition, the mandrel support member 322 may support the hood system 220. In one example, the mandrel support member 322 may be configured as a perforated plate or grating (not shown) for supporting the mass of the mandrel 300 when positioned within the outer shell 102. For example, FIG. 6 illustrates the mandrel support member 322 configured as an annularly-shaped plate having an outer perimeter edge coupled to the second shell portion 108. The annularly-shaped plate may extend radially inwardly at least to the radial location of the mandrel proximal end 304 when the mandrel 300 is positioned within the outer shell 102. The mandrel 300 may be supported on the annularly-shaped plate as may the hood system 220. The annularly-shaped plate may have openings, holes, slots, or apertures to allow the gas 152 to freely pass through the annularly-shaped plate as the gas 152 flows along the gas circulation path 250. Alternatively or additionally, the workpiece heating system 100 may include one or more mandrel support members 322 configured as a plurality of discrete struts (not shown) extending radially inwardly from the second shell portion 108 to support the mandrel 300 when positioned within the outer shell 102. In other embodiments, the mandrel proximal end 304 may be supported on the gas displacement device 150 and/or on the heat exchanger 200, either or both of which may be mounted to or supported by the second shell portion 108 (e.g., lower shell portion).

The mandrel 300 in FIG. 6 includes a mandrel partside 310 and a mandrel backside 312 opposite the mandrel partside 310. The mandrel partside 310 supports the workpiece 418 during processing (e.g., curing) of the workpiece when enclosed within the outer shell 102. The mandrel partside 310 may also be described as the layup surface of the mandrel 300. For example, the workpiece 418 such as the above-described inner barrel section 416 may be laid up on the mandrel partside 310 of the mandrel 300, after which the mandrel-supported sandwich structure 426 may be positioned within the outer shell 102. The heat exchanger 200 and gas displacement device 150 may then be operated in a manner to heat the mandrel 300 and workpiece 418 to facilitate the curing of film adhesive (not shown) of the sandwich structure 426 for bonding each face sheet 428 (FIG. 5) to the core 430 (FIG. 5).

Referring to FIG. 5-6, the outer shell 102 may be sized and configured complementary to the hood system 220, which may be sized and configured complementary to the mandrel 300 and workpiece 418. In the FIG. 6, the outer shell 102 includes a shell side wall 110 having a cylindrical cross-section and is enclosed by a shell dome 112 at the shell proximal end 114 and at the shell distal end 116. The shell domes 112 and cylindrical cross-section of the shell side walls 110 allow the outer shell 102 to withstand internal pressurization of the outer shell 102. However, the outer shell 102 may be configured to be non-pressurized in which case the shell side wall 110 may be non-cylindrical although a non-pressurized version of the outer shell may have a cylindrical cross-section. The outer shell 102 may be provided in any one a variety of different shapes and geometries. For example, the outer shell 102 may be formed as a multi-sided wall (not shown) having one or more planar side wall portions (not shown) and may be enclosed by a generally planar plate (not shown) at the shell proximal end 114 and/or at shell distal end 116. In the below-described example of the workpiece heating system 100 shown in FIGS. 24-27, the outer shell 102 has a non-circular cross-section configured complementary to the internal components. However, the outer shell 102 of the embodiment of the workpiece heating system 100 shown in FIGS. 24-27 may have a circular cross-section.

In any one of the embodiments of the workpiece heating system 100, the outer shell 102 may be formed of a relatively rigid material. For example, the outer shell 102 may be formed of metallic material such as steel, aluminum, or other metallic material. Alternatively or additionally, the outer shell 102 may be formed of a non-metallic material such as non-fiber-reinforced polymeric material, or the outer shell 102 may be formed of a combination of metallic material and non-metallic material. The outer shell 102 may be configured to physically support the mass of the components including, but not limited to, the heat exchanger 200, the gas displacement device 150, the mandrel 300 and workpiece 418, and other components.

For embodiments of the workpiece heating system 100 configured for high-temperature and/or high-pressure processing of workpieces 418, the outer shell 102 may be formed of a steel alloy having a relatively high yield strength at elevated temperatures and/or pressures. As mentioned above, in some examples, the outer shell 102 may be configured to be pressurized above atmospheric pressure to allow for the application of relatively high compaction pressure on a composite part 424, such as a stack of uncured composite plies (not shown). As shown in FIG. 6, the outer shell 102 may optionally include thermal insulation 120. For example, the inner surface of the outer shall may be lined with a layer of insulation formed of foam, rubber, ceramic, or other thermally-insulative material to reduce heat loss to the outside environment and/or to maintain the surface of the outer shell 102 at a temperature that is safe for a factory environment.

As mentioned above, the outer shell 102 may include a first shell portion 106 and a second shell portion 108 configured to be mated to each other along a shell joint 118. In some examples of the workpiece heating system 100, the first shell portion 106 may be lifted and lowered into position over the second shell portion 108 such as by using an overhead crane or other lifting means. For relatively small mandrels 300, the mandrel/workpiece, hood system 220, and first shell portion 106 may be translated along a factory floor and manually lifted into position onto the second shell portion 108, avoiding the need for an overhead crane. In the example shown in FIG. 6, the shell joint 118 between the first shell portion 106 and the second shell portion 108 may be configured as a circumferential joint oriented generally perpendicular to the mandrel axis 302 when the mandrel 300 is positioned within the outer shell 102. In some embodiments, the shell joint 118 may be configured to seal the first shell portion 106 to the second shell portion 108 in a manner allowing the interior of the outer shell 102 to be positively pressurized using a positive pressure source 370 (e.g., FIG. 32) as may be desirable for increasing compaction pressure on a workpiece 418.

The shell joint 118 may have any one a variety of configurations. For example, although not shown, the first shell portion 106 and the second shell portion 108 may each include a circumferential flange (not shown) to facilitate mating of the first shell portion 106 to the second shell portion 108. Each circumferential flange may include mating holes (not shown) for receiving mechanical fasteners for fastening the first shell portion 106 to the second shell portion 108. In a further embodiment not shown, the first shell portion 106 and the second shell portion 108 may be mated to each other using an external ring (not shown) extending around the circumference of the shell joint 118 and being rotatable in a manner forcing the first shell portion 106 and the second shell portion 108 into mating contact with each other around the circumference of the shell joint 118. In any one of the outer shell 102 embodiments, the shell joint 118 may be sealed using one or more circumferential O-ring seals (not shown) mounted within circumferential grooves (not shown) optionally formed in the flanges (not shown) of the first shell portion 106 and the second shell portion 108. In a still further embodiment, the first shell portion 106 may be coupled to the second shell portion 108 by one or more hinges (not shown) to allow pivoting of the first shell portion 106 away from the second portion to allow access to the interior of the outer shell 102 for installing or removing the hood system 220 and the mandrel 300 and workpiece 418, and for allowing access to the operating components such as the gas displacement device 150 and the heat exchanger 200.

Referring still to FIG. 6, the gas displacement device 150 may be mounted to the outer shell 102 in a location allowing the mandrel 300 to be generally centered relative to the gas displacement device 150. The gas displacement device 150 may include a device housing 158 having a central intake 164 configured to receive gas 152 from the heat exchanger 200. The gas 152 may be ambient air, or the gas may be nitrogen, carbon dioxide, or other gas composition that may be injected into the outer shell 102 once the first shell portion 106 is mated to the second shell portion 108. The selection of the composition of the gas 152 for use in the workpiece heating system 100 may be based upon the processing parameters for the workpiece 418. For example, air may be used for processing (e.g., curing) composite parts 424 at relatively low temperatures and/or at relatively low pressures (e.g., atmospheric pressure) within the workpiece heating system 100. In contrast, nitrogen or carbon dioxide or other inert gas may be used for processing a workpiece 418 at elevated temperatures and/or elevated pressures (e.g., above atmospheric pressure) within the workpiece heating system 100.

The gas displacement device 150 includes an outer circumferential exit 166 configured to discharge the gas 152 radially outwardly. In FIG. 6, the outer circumferential exit 166 is located such that gas 152 is discharged radially outwardly toward the mandrel backside 312 when the mandrel 300 is positioned within the outer shell 102. As described below, as the gas 152 impinges on and/or attaches to or flows over the mandrel backside 312, the gas 152 convectively heats or cools (depending on whether the gas is hotter or colder than the workpiece 418) the mandrel 300 which conductively heats or cools the workpiece 418 supported on the mandrel partside 310. In addition, on the opposite side of the mandrel 300, the gas 152 flowing over the workpiece 418 convectively heats or cools the workpiece 418.

The gas displacement device 150 may discharge the gas 152 (e.g., heated or cooled gas) in a manner such that the gas 152 impinges or attaches to or flows uniformly over the mandrel backside 312 at relatively high velocity. For example, the gas 152 may flow directly along the mandrel backside 312 of the mandrel 300 at a controlled velocity in a manner resulting in circumferentially uniform heating of the mandrel 300. In some examples such as in FIG. 6, the impingement of the gas 152 along the mandrel backside 312 may be described as being direct impingement in the sense that at least some of the gas 152 exiting the outer circumferential exit 166 of the gas displacement device 150 flows directly toward the mandrel backside 312 without changing direction and/or without being obstructed by any other structure or component. In one example, direct impingement may be described as resulting from a line-of-sight flow path of at least some of the gas 152 from the outer circumferential exit 166 to the mandrel backside 312. Direct impingement of the gas 152 against the mandrel backside 312 or attachment or movement of the gas 152 along the mandrel backside 312 may significantly increase the rate at which the temperature of the workpiece 418 changes (e.g., is heated or cooled). In addition to directing the gas 152 toward and/or along the mandrel backside 312, the gas displacement device 150 may be described as a circulation fan configured to circulate the gas 152 through the interior of the workpiece heating system 100 as described below.

The gas displacement device 150 may include a fan disc 156 (e.g., FIG. 12) having fan blades or a fan wheel for drawing gas 152 into the central intake 164 and radially discharging gas 152 from the outer circumferential exit 166. The gas displacement device 150 may be rotatably driven by a motor 180, such as an electric motor although the gas displacement device 150 may be rotatably driven by other means such as pneumatic means (not shown). In the example of FIGS. 6-7, the gas displacement device 150 is operatively coupled by a shaft 184 to a motor 180 (e.g., electric motor) located outside of the outer shell 102 to avoid the need for a high-temperature-capable motor 180. The motor 180 may be contained within a motor housing 182 for protection from the elements. The motor housing 182 may be mounted to the exterior of the outer shell 102. The shaft 184 may be sealed to the outer shell 102 using a shaft seal 186. However, in other examples, the motor 180 may be mounted within the outer shell 102. For example, the motor 180 may be mounted to or integrated with the gas displacement device 150 as shown in the embodiment of FIGS. 14, 19, 26, and 32 as described below.

In FIGS. 6-7, the heat exchanger 200 is mounted within the outer shell 102 upstream of the gas displacement device 150. The heat exchanger 200 may include a heat exchanger housing 202 configured to be coupled to the device housing 158 of the gas displacement device 150. The heat exchanger 200 is configured to receive the gas 152 circulating through the interior in the manner shown in FIGS. 6, 13, 14, 19, and 26, and condition (e.g., heat or cool) the gas 152 prior to the gas 152 entering the central intake 164 of the gas displacement device 150. The heat exchanger 200 may heat or cool the gas 152 depending upon whether the workpiece 418 requires heating or cooling to maintain the workpiece 418 within the temperature range and/or ramp rate dictated by the workpiece 418 processing (e.g., consolidating, curing, etc.) requirements.

The heat exchanger 200 may be located immediately upstream of the gas displacement device 150 with no other components between the heat exchanger 200 and the gas displacement device 150. In some examples, the heat exchanger 200 (e.g., a heating device 204 and optional cooling device 206) may be fluidly coupled (e.g., via an annular duct—not shown) to the central intake 164 of the gas displacement device 150. In other examples, the outlet of the heat exchanger 200 may be directly coupled to the central intake 164 of the gas displacement device 150. As indicated above, the heat exchanger 200 is configured to heat and/or cool the gas 152 circulating through the interior of the workpiece heating system 100 prior to the gas 152 entering the central intake 164 of the gas displacement device 150.

Referring still to FIGS. 6-7, the heat exchanger 200 may be configured as a single circumferentially-arranged heat exchanger 200. Alternatively, in an embodiment not shown, the heat exchanger 200 may be configured as plurality of circumferentially-arranged heat exchangers 200. The one or more heat exchangers 200 may include one or more heating devices 204. A plurality of heating devices 204 may be circumferentially arranged. One or more of the heating devices 204 may be configured as an electric heater such as a heater containing electrical-resistance heating elements.

In a still further embodiment, one or more of the heating devices 204 may be provided as a heater circulating a fluid medium such as steam, hot water or oil through heat transfer tubes (not shown) of the heating device 204. For example, the heating devices 204 may be configured to draw in and circulate a fluid medium within the heating device 204. The thermal fluid may be heated by the combustion of gas or oil in a combustion chamber (not shown) located external to the outer shell 102. However, the one or more heating devices 204 may be provided in any one of a variety of configurations capable of heating the gas 152 in a manner that allows for heating the workpiece 418 to the desired processing (e.g., curing) temperature.

The heat exchanger 200 may also include one or more cooling devices 206 for actively cooling the workpiece 418 and/or controlling the cool down rate of the workpiece 418. For example, the heat exchanger 200 may include a plurality of circumferentially-arranged cooling devices 206 located radially inboard of a plurality of circumferentially-arranged heating devices 204, or the heating devices 204 may be located radially inboard of the cooling devices 206. Such cooling devices 206 may allow for cooling the workpiece 418 and mandrel 300 at a faster rate than would be achievable with passive cooling. Advantageously, a cooling device 206 may allow for cooling the workpiece 418 at a rate that can reduce or prevent microcracking that may otherwise occur due to thermally-induced stresses caused by differences in the coefficient of thermal expansion (CTE) of the materials that make up the workpiece 418. In one example, a cooling device 206 may include a plurality of cooling tubes (not shown) through which a cooling fluid such as cooling water may be circulated.

Figure 14:
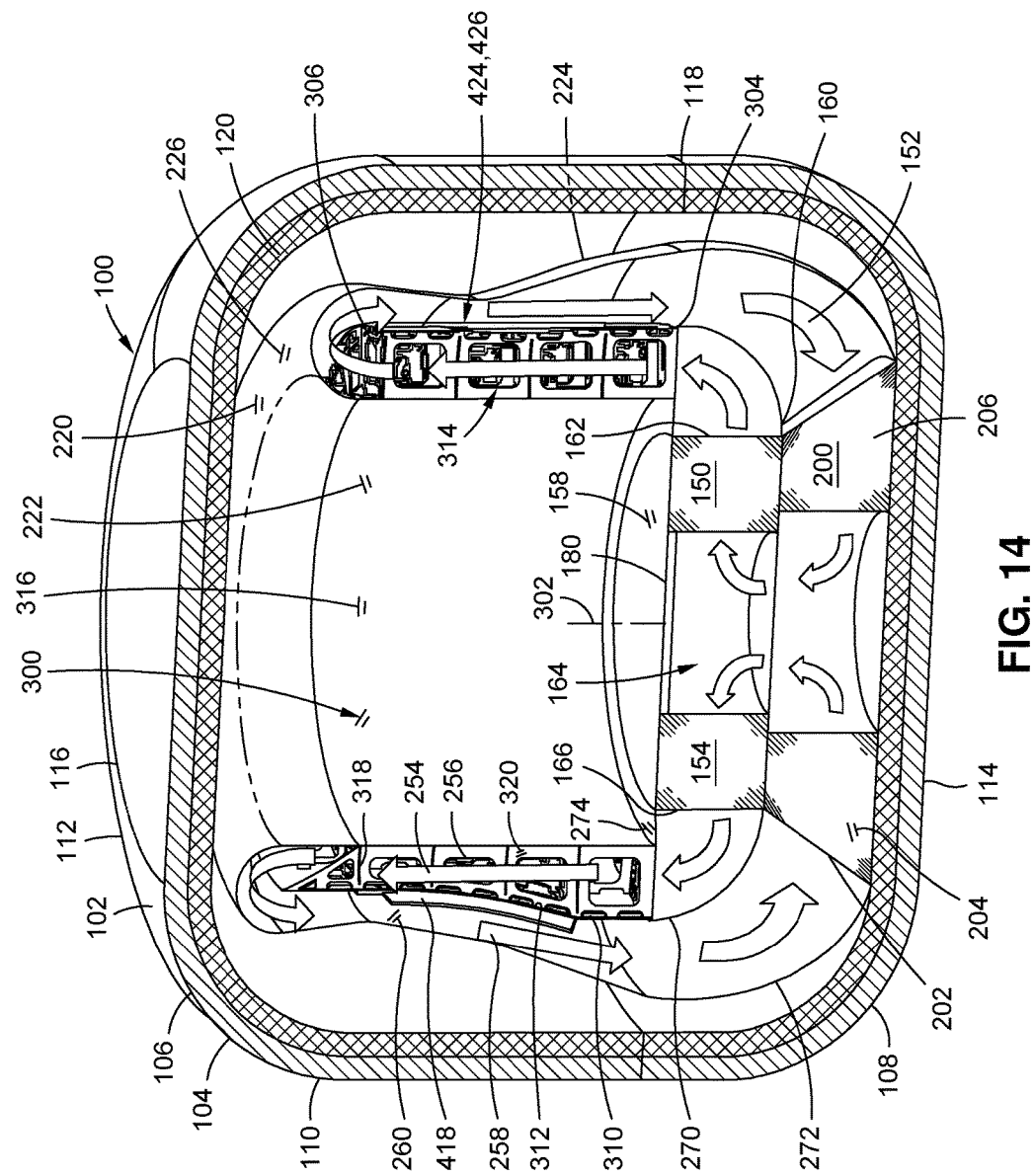
FIG. 14 is a perspective sectional view of a further example of a workpiece heating system wherein the gas displacement device and at least one heat exchanger are located aft of a mandrel proximal end, and further illustrating a mandrel reinforcing structure coupled to the mandrel backside.
Figure 19:
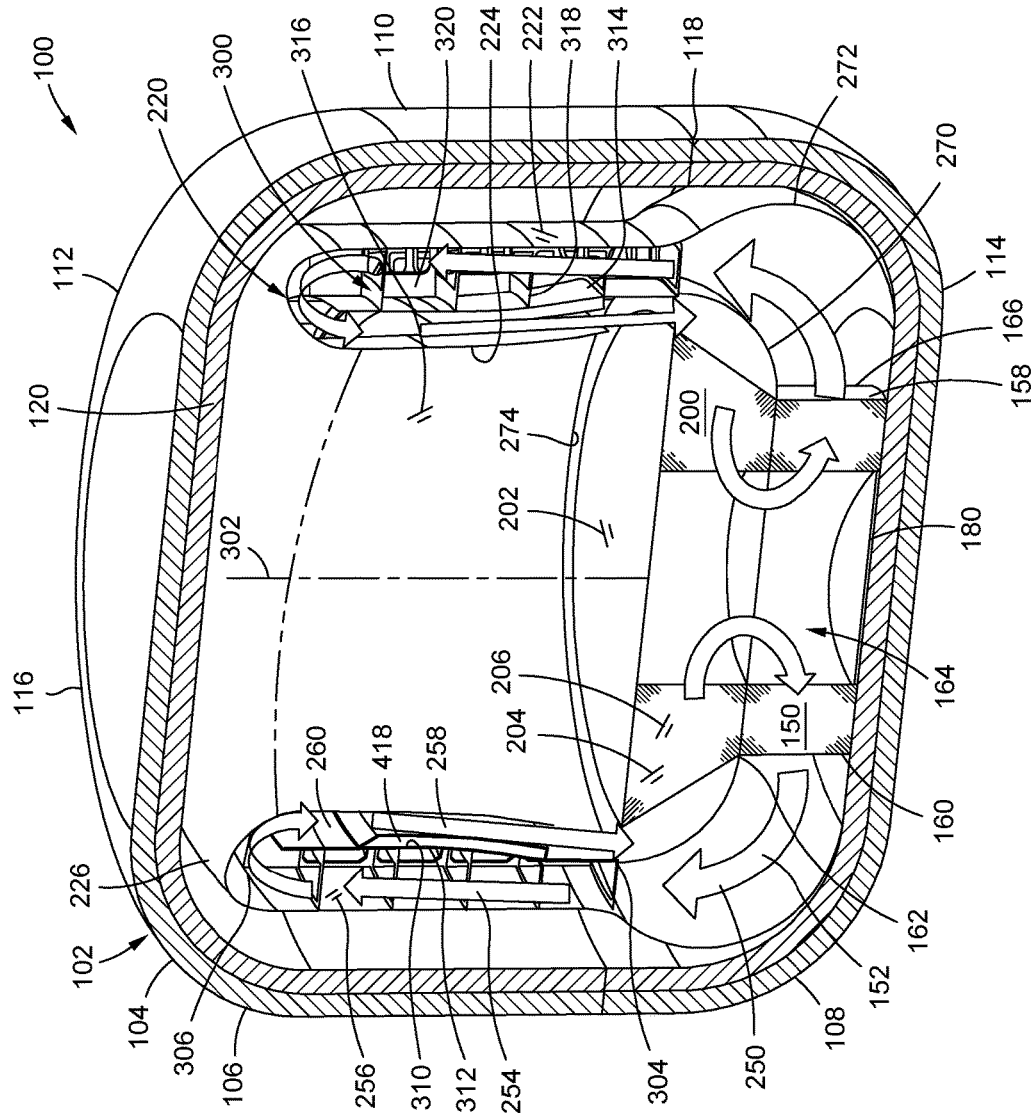
FIG. 19 is a side sectional view of a further example of a workpiece heating system wherein the gas displacement device is located below the heat exchanger and the workpiece is supported on a radially inner side of the mandrel, and further illustrating the gas circulation path in which the gas initially flows through the first annular gap between the hood outer wall and the mandrel backside, after which the gas flows in a reverse direction through the second annular gap between the hood inner wall and the mandrel partside.
Figure 26:
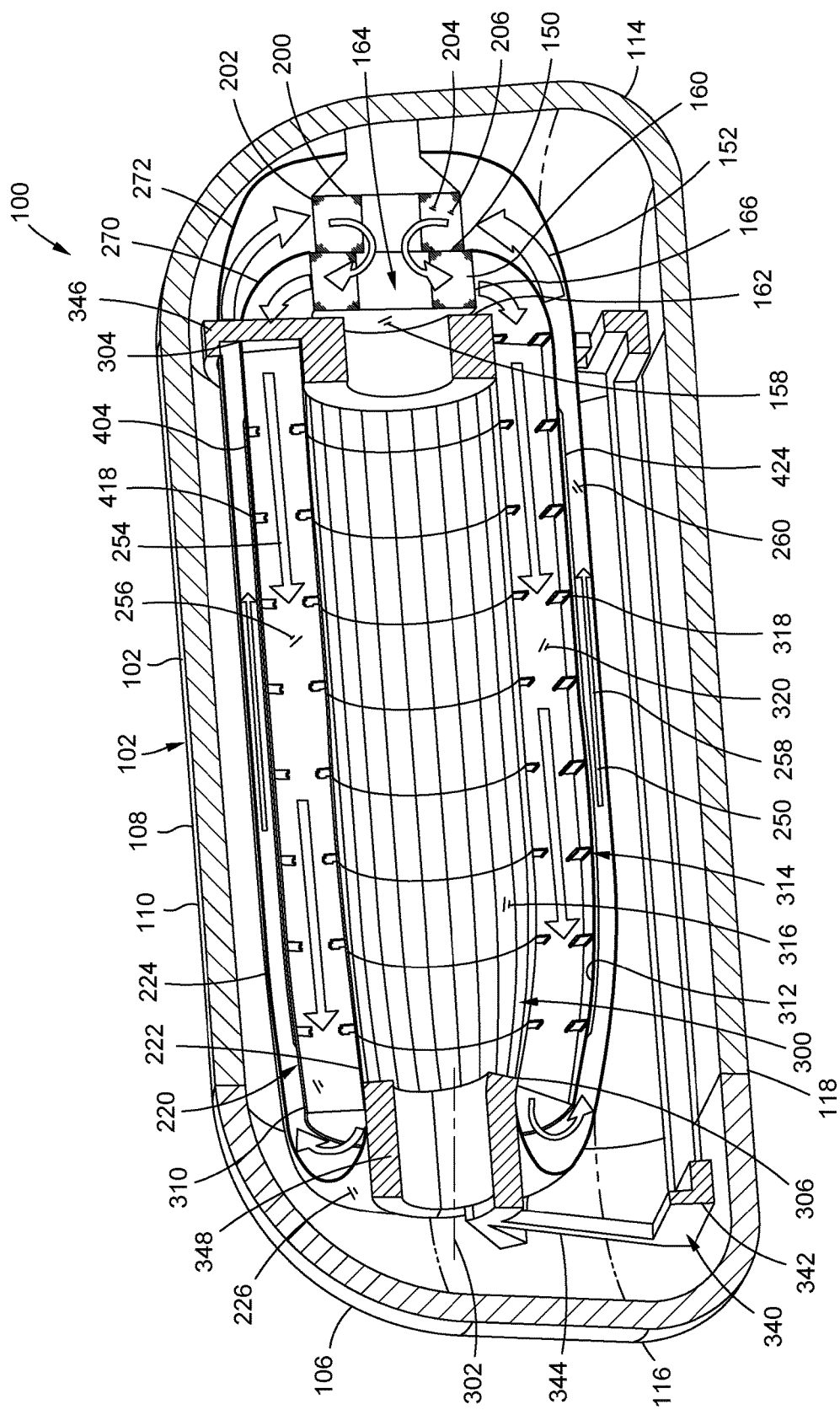
FIG. 26 is a perspective sectional view of the workpiece heating system of FIG. 25.

Referring to FIGS. 6-8, shown is the hood system 220, which includes a hood first wall 222 and a hood second wall 224 each configured to extend circumferentially in radially spaced relation to each other. In the embodiments disclosed herein, when the workpiece heating system 100 is in the assembled or enclosed state as shown in FIG. 6, the hood system 220 is configured such that the hood first wall 222 is in radially spaced relation to the mandrel backside 312, and the hood second wall 224 is in radially spaced relation to the mandrel partside 310. In FIG. 6, the hood first wall 222 is located radially inboard of the hood second wall 224, and the mandrel partside 310 is located radially outboard of the mandrel backside 312. In this regard, FIG. 6 and below-described FIGS. 14 and 26 illustrate embodiments in which the workpiece 418 has an inner mold line (IML) 420 located on the radially inner side of the workpiece 418. A mold line may be described as the surface of the workpiece 418 that is in contact with the mandrel partside 310 and is molded to the contour of the mandrel partside 310. Below-described FIG. 19 illustrates an embodiment in which the workpiece 418 has an outer mold line (OML) 422 located on a radially outer side of the workpiece 418.

The hood system 220 in combination with the mandrel 300 and workpiece 418 collectively define a gas circulation path 250 along which the gas 152 flows over the mandrel 300 and the workpiece 418. In this regard, the hood first wall 222 and the mandrel backside 312 collectively define a first annular gap 256 configured to receive the gas 152 discharged from the gas displacement device 150, and direct the gas 152 in a generally axial direction along a first flow path segment 254 of the gas circulation path 250 from the mandrel proximal end 304 to the mandrel distal end 306. The hood second wall 224 and the mandrel partside 310 collectively define a second annular gap 260 configured to receive the gas 152 from the first annular gap 256 and direct the gas 152 in a generally axial direction along a second flow path segment 258 of the gas circulation path 250 from the mandrel distal end 306 to the mandrel proximal end 304. The gas 152 from the second flow path segment 258 is drawn into the heat exchanger 200 under the circulating force of the gas displacement device 150. The gas 152 is conditioned (e.g., heated or cooled) by the heat exchanger 200 prior to re-entering the gas displacement device 150 for recirculation along the gas circulation path 250.

Referring still to FIGS. 6-8, the hood first wall 222 and hood second wall 224 each have a wall proximal end and a wall distal end. The wall proximal end of the hood first wall 222 may be coupled to the housing distal end 162 of the device housing 158 of the gas displacement device 150. The hood system 220 may include a hood end wall 226 connecting the wall distal ends of the hood first wall 222 and the hood second wall 224. The hood end wall 226 may be included in any one of the embodiments disclosed herein, and may facilitate a smooth reversal in the direction of the gas 152 flowing along the first flow path segment 254 to an opposite direction of the gas 152 flowing along second flow path segment 258. When the hood system 220 is viewed along a radial cross-section as shown in FIG. 8, the hood end wall 226 may have a profile forming an approximately 180-degree arc for providing a smoothly curved path for reversing the flow direction of the gas 152. The hood end wall 226 may be tangent to the wall distal end of the hood first wall 222 and tangent to the wall distal end of the hood second wall 224.

In the example of FIGS. 6-8, the hood first wall 222, the hood end wall 226, and the hood second wall 224 may be formed as a one-piece structure sized and shaped complementary to the mandrel 300 and workpiece 418. The hood system 220 may be formed of metallic material and/or non-metallic material. For example, the hood system 220 may be formed of aluminum, steel, and/or polymeric material capable of retaining structural integrity at operating temperatures in the interior of the workpiece heating system 100. When viewed along a radial cross-section as shown in FIG. 8, the hood system 220 may be configured such that the hood first wall 222 is contoured in a manner to maintain a desired spacing from the mandrel backside 312. Likewise, the hood second wall 224 may be contoured in a manner to maintain a desired spacing from the mandrel partside 310 and workpiece 418. As described below, the contour and the spacing between the hood system 220 and the mandrel 300 may be dictated in part by the volumetric flow rate of the gas 152 along the gas circulation path 250, the flow velocity of the gas 152, and other parameters. In this regard, the geometry of the hood system 220 may be different for different configurations of the mandrel 300 and workpiece 418.

Referring to FIGS. 9-11, shown is the mandrel 300 of FIGS. 5-7 with the workpiece 418 supported on the mandrel partside 310. FIG. 10 is a cross-section of the mandrel 300 showing the contour of the workpiece 418 and mandrel partside 310. FIG. 11 is a sectional view of a portion of the upper edge of the workpiece 418 showing an example of a vacuum bag 362 covering the workpiece 418. In FIG. 11, the workpiece 418 may be configured as a composite part 424 comprising a sandwich structure 426 having a honeycomb core 430 and opposing face sheets 428. The vacuum bag 362 may be sealed to the mandrel partside 310 using a bag sealant 364. Also shown is a vacuum line 366 that may be fluidly coupled to the vacuum bag 362 and extended through the outer shell 102 to a vacuum source 360 for applying a vacuum to the vacuum bag 362. The vacuum bag 362 may facilitate the drawing of air, moisture, and/or volatiles out of the workpiece 418 and/or for generating compaction pressure on the workpiece 418 during the application of a vacuum on the vacuum bag 362.

Although the mandrel 300 in FIG. 9 is generally cylindrical and has a radially outer mandrel partside 310 (FIG. 10) for imparting an inner mold line 420 (FIG. 10) contour on the composite part 424, in other examples not shown, the mandrel 300 may have a non-cylindrical shape such as an ovalized shape, and may have a radially inner mandrel partside 310 (e.g., FIG. 19). In still further examples not shown, the mandrel 300 may have a non-rounded cross-sectional profile such as a shape having one or more generally flat mandrel surfaces (not shown) optionally joined by radiused corners (not shown). In this regard, the workpiece heating system 100 may be shaped and configured to enclose a mandrel 300 having any one a variety of different sizes, shapes, and configurations. For example, the mandrel 300 may be configured as a hollow mandrel having an airfoil cross-section (not shown) upon which composite plies may be laid up and then positioned inside a complementarily-configured version of the workpiece heating system 100 for consolidating and curing the composite ply layup. Non-limiting examples of mandrels having an airfoil cross-section include a mandrel for manufacturing a wing 406 (FIG. 1), a tail surface (e.g., horizontal tail 408 or a vertical tail 410—FIG. 1), a winglet, or a control surface. Such a hollow mandrel may be positioned in an approximately vertical orientation similar to the vertical orientation of the mandrel 300 of FIG. 6 with the gas displacement device 150 and heat exchanger 200 being centered relative to the mandrel 300. In another example, the mandrel 300 may be configured as a hollow cure mandrel 300 for laying up and curing a hollow elongate composite part 424 such as a fuselage barrel section 404 (FIG. 1) using a workpiece heating system 100 configured similar to the embodiment shown in FIGS. 24-27 and described below.

Figure 12:
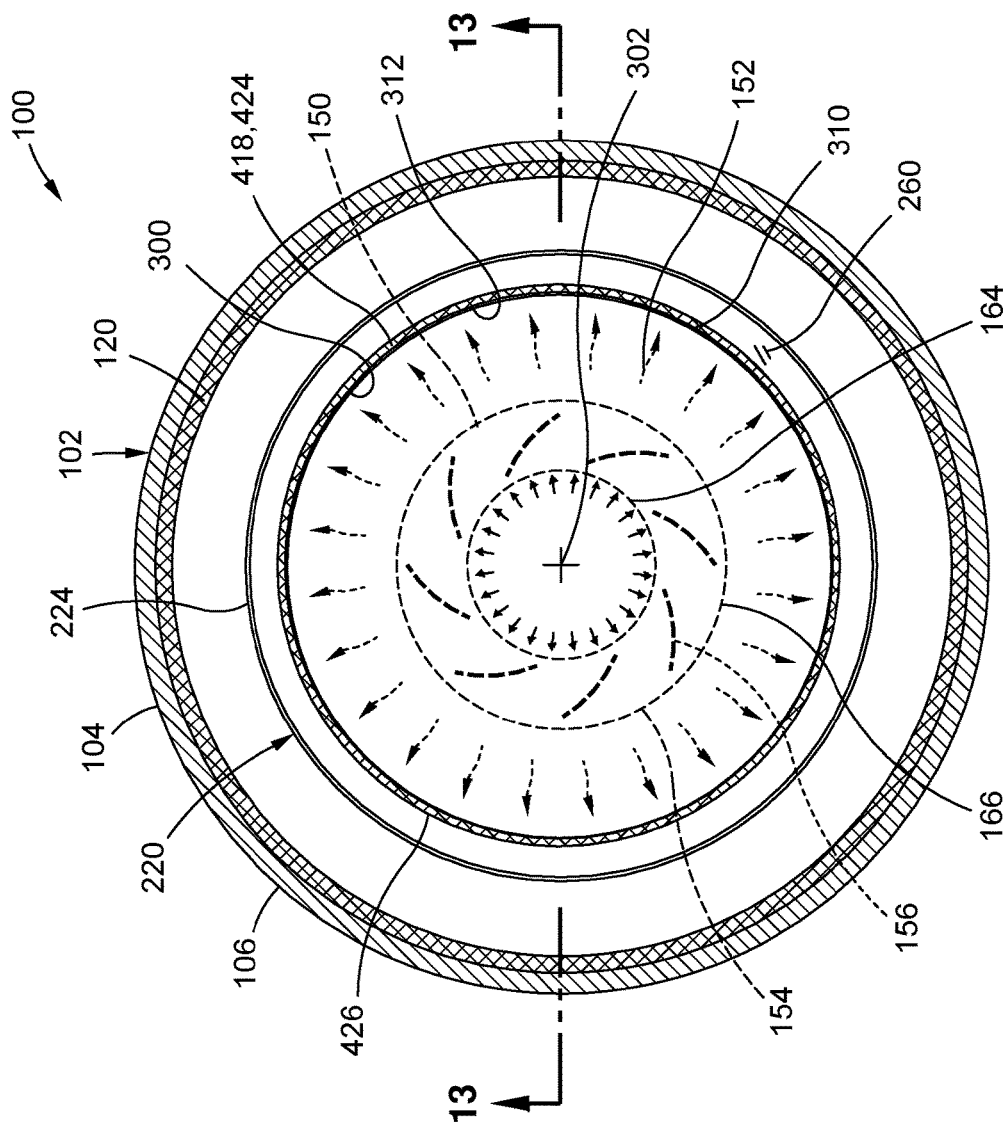
FIG. 12 is a top sectional view of the workpiece heating system of FIG. 4 and illustrating the gas displacement device configured as a centrifugal fan.

Referring to FIG. 12, shown is a top sectional view of the workpiece heating system 100 of FIG. 6 showing the mandrel 300 and workpiece 418, the gas displacement device 150, and the hood system 220 enclosed by the outer shell 102. Also shown is a layer of thermal insulation 120 optionally lining the outer shell 102. The hood second wall 224 (i.e., the hood outer wall) is shown surrounding the mandrel 300 and workpiece 418, which is supported on the mandrel partside 310 of the mandrel 300. The gas displacement device 150 is centrally located relative to the mandrel 300 and has a device housing 158 for receiving gas 152 at the central intake 164 and discharging the gas 152 (e.g., heated air) from the outer circumferential exit 166 in a radial direction toward the mandrel backside 312. In the embodiment shown, the gas displacement device 150 is configured as a single centrifugal fan 154 having a fan disc 156. The fan disc 156 may include a plurality of fan blades. The centrifugal fan 154 may discharge the gas 152 radially outwardly 360 degrees around the outer circumferential exit 166.

Although the gas displacement device 150 is illustrated in FIG. 12 as a single centrifugal fan 154, in an embodiment not shown, the gas displacement device 150 may be comprised of a plurality of axial fans (not shown) arranged in a circular array around the fan housing. Each axial fan may be configured to receive gas 152 from the central intake 164, and may be oriented to discharge gas 152 radially outwardly from the outer circumferential exit 166. Each axial fan of the circular array may be described as having fan blades arranged to accelerate the gas 152 along a direction parallel to an axis of rotation of the fan blades. In contrast, the fan blades of the single centrifugal fan 154 illustrated of FIG. 12 accelerate the gas 152 along a direction perpendicular to the axis of rotation of the fan blades which may be coincident with the mandrel axis 302.

Figure 13:
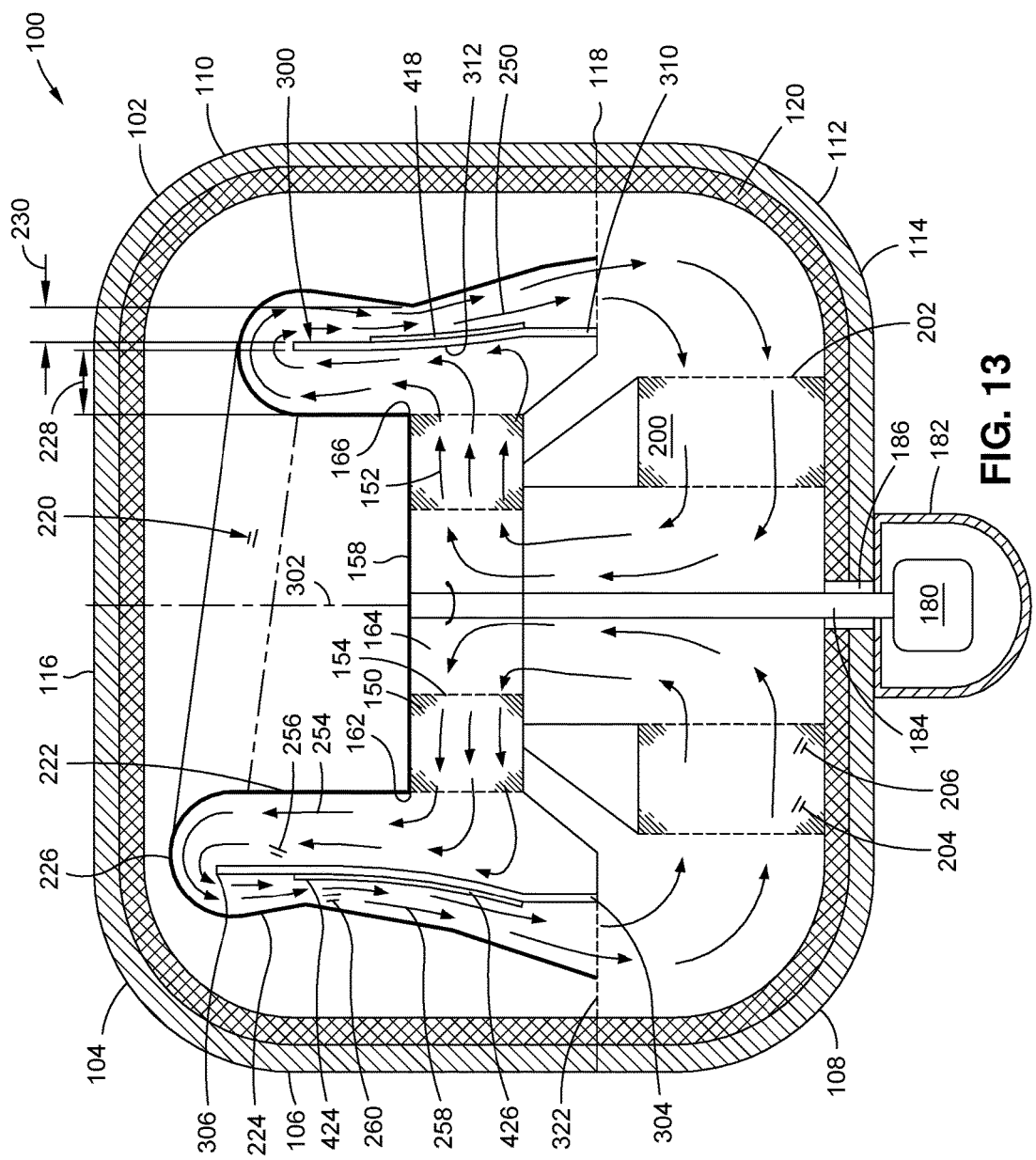
FIG. 13 is a side sectional view of the workpiece heating system taken along line 13 of FIG. 12 and illustrating gas flowing through a first annular gap between a hood inner wall and the mandrel backside along a first flow path segment of a gas circulation path, and also illustrating the gas flowing through a second annular gap between a hood outer wall and the mandrel partside (and workpiece) along a second flow path segment of the gas circulation path.

Referring to FIG. 13, shown is a side sectional view of the workpiece heating system 100 of FIG. 12 illustrating the gas 152 flowing through the first annular gap 256 between the hood first wall 222 (e.g., the hood inner wall) and the mandrel backside 312 along the first flow path segment 254 of the gas circulation path 250, and also illustrating the gas 152 flowing through the second annular gap 260 between the hood second wall 224 (e.g., the hood outer wall) and the mandrel partside 310 (and workpiece 418) along the second flow path segment 258 of the gas circulation path 250. As shown in FIGS. 6 and 12, the gas displacement device 150 is positioned such that the housing proximal end 160 of the device housing 158 of the gas displacement device 150 is axially no further aft than the mandrel proximal end 304. More specifically, the outer circumferential exit 166 is generally at the same axial location as the aft portion of the workpiece 418.

By positioning the gas displacement device 150 as shown, the gas 152 discharging from the outer circumferential exit 166 of the gas displacement device 150 impinges directly on the mandrel backside 312 at a relatively high velocity at a location on the mandrel 300 opposite the workpiece 418, resulting in a relatively high heat transfer from the gas 152 to the mandrel 300 and workpiece 418. Because the gas 152 discharging from the outer circumferential exit 166 may be at the highest temperature (for heated gas 152), the gas 152 impinging on and/or flowing along the mandrel backside 312 rapidly heats and diffuses through the thermal mass of the mandrel 300 causing conductive heating of the workpiece 418. The diffusion or distribution of heat through the thermal mass of the mandrel 300 advantageously reduces or avoids temperature gradients that may otherwise occur at different locations of the workpiece 418 if the gas 152 discharging from the gas displacement device 150 were to impinge directly on the workpiece instead of on the mandrel backside 312. In this manner, the arrangement of the workpiece heating system 100 promotes uniform heating (or cooling) of all locations across the workpiece 418, which can result in the ability to cure the workpiece 418 within relatively narrow temperature ranges that may be required at each of one or more cure stages of a cure cycle, thereby ensuring uniform mechanical properties at all locations throughout the cured workpiece 418.

Referring still to FIG. 13, the hood system 220 directs the gas 152 through the first annular gap 256 and the second annular gap 260 causing the gas 152 to flow over the mandrel 300 and workpiece 418, further adding to the heat transfer to the workpiece 418 and reducing overall cure cycle time. In some examples, the hood system 220 may be configured to provide a wall-backside spacing 228 of from approximately 1-10 inches (2.54-25.4 centimeters) between the hood first wall 222 and the mandrel backside 312. In addition, the hood system 220 may be configured to provide a wall-partside spacing 230 of from approximately 1-10 inches (2.54-25.4 centimeters) between the hood second wall 224 and the mandrel partside 310 and the workpiece 418 supported on the mandrel partside 310. In some examples, the wall-backside spacing 228 and/or the wall-partside spacing 230 may be in the range of approximately 2-6 inches (5.08-15.2 centimeters). However, the wall-backside spacing 228 and/or the wall-partside spacing 230 may be less than 1 inch (2.54 centimeters) or greater than 10 inches (25.4 centimeters). In addition, the wall-backside spacing 228 may be different than the wall-partside spacing 230. In this regard, the geometry of the hood system 220 such as the cross-sectional profile of the hood first wall 222 and hood second wall 224 may be configured to provide the desired flow characteristics of the gas 152. However, the geometry of the hood system 220 and the spacing between the hood walls and the mandrel 300 and workpiece 418 may be dependent upon any one or more of several parameters including, but not limited to, volumetric flow rate of the gas 152, target gas velocity, temperature of the gas 152 exiting the displacement device, flow attachment of the gas 152 to the mandrel 300 and/or workpiece 418, workpiece target heatup ramp rate, and other parameters. The geometry of the hood system 220 may be different for different mandrel 300 configurations and/or different workpiece 418 configurations.

It should be noted that the structure, functionality, and/or arrangement of any one of the embodiments of any of the components of any one of the workpiece heating system 100 examples described herein and/or shown in the figures may be interchangeably implemented in any one of the other embodiments of the workpiece heating system 100. For example, any one of the embodiments of any of the above-described components of the workpiece heating system 100 of FIGS. 4-13 may be used in any one of the below-described embodiments of the workpiece heating systems 100 of FIGS. 14-27.

Figure 15:
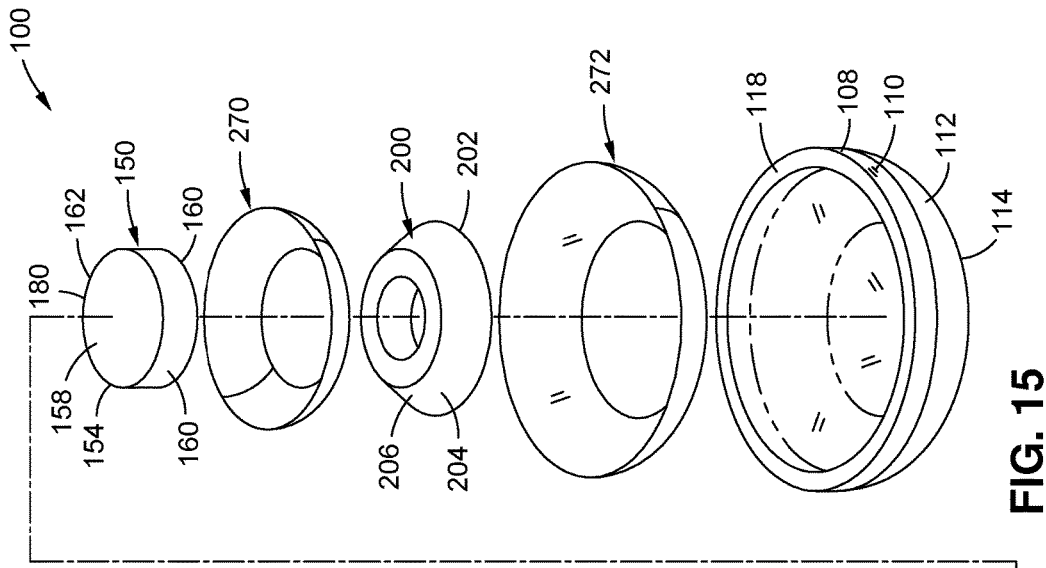
FIG. 15 is an exploded perspective view of the workpiece heating system of FIG. 14.

Referring to FIGS. 14-15, shown is an embodiment of the workpiece heating system 100 configured similar to the above-described embodiment shown in FIG. 6 with several differences. In FIG. 14, the gas displacement device 150 and the heat exchanger 200 are mounted within the outer shell 102 such that when the mandrel 300 is positioned within the outer shell 102, the gas displacement device 150 and the heat exchanger 200 are located axially below or aft of the mandrel proximal end 304. The gas displacement device 150 and the heat exchanger 200 may be fixedly mounted to the second shell portion 108 (e.g., the lower shell portion). The housing distal end 162 of the device housing 158 of the gas displacement device 150 may be located flush with or slightly below the mandrel proximal end 304 which may be at approximately the same axial position as the shell joint 118 between the first shell and the second shell portion 108. The motor 180 may be integrated into the gas displacement device 150 or the motor 180 may be located outside of the outer shell 102 similar to the above-described arrangement of FIGS. 6 and 13. By locating the distal end (e.g., the upper end) of the gas displacement device 150 flush with or below the level of the shell joint 118, the mandrel 300 may be translated horizontally into position over the gas displacement device 150, thereby avoiding the need to vertically lift the mandrel 300 up and over the gas displacement device 150 and vertically lower the mandrel 300 into position around the gas displacement device 150, as may be required for the workpiece heating system 100 embodiment of FIG. 6.

In FIG. 14, an annular housing extension 274 extends between the outer perimeter of the device housing 158 of the gas displacement device 150 and the proximal end of the hood first wall 222. The hood first wall 222 is the radially innermost wall of the hood system 220. In some embodiments, the annular housing extension 274 may be integral with the device housing 158 of the gas displacement device 150 or integral with the heat exchanger housing 202. In other embodiments, the annular housing extension 274 may be a separate component from the device housing 158 of the gas displacement device 150 or a separate component from the heat exchanger housing 202. The housing extension 274 may be unique to each unique mandrel configuration. The annular housing extension 274 may be attached to and/or sealed to the proximal end of the hood first wall 222.

Figure 16:
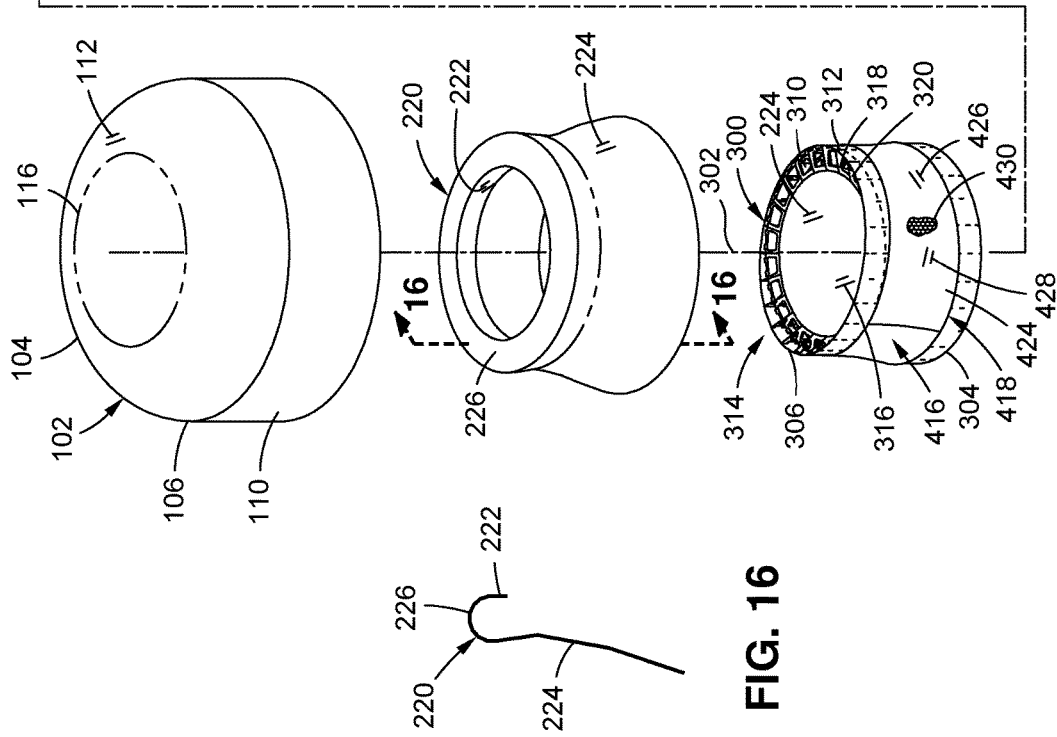
FIG. 16 is a side sectional view of the hood system taken along line 16 of FIG. 15.

Also in FIG. 14, the mandrel 300 includes a mandrel reinforcing structure 314, also be described as an egg crate structure, coupled to the mandrel backside 312 for reducing thermal distortion of the mandrel 300 during temperature changes of the mandrel 300 during operation of the workpiece heating system 100. The mandrel reinforcing structure 314 includes a mandrel circumferential wall 316 located in spaced relation to the mandrel backside 312. The mandrel circumferential wall 316 comprises or functions as a lower portion of the hood first wall 222 which is the radially innermost wall. As shown in FIG. 16, the upper portion of the hood first wall 222 is integral with the hood end wall 226 and the hood second wall 224 which is the radially outermost wall in FIGS. 14-15.

Referring to FIGS. 14-15, shown is an annular inner gas flow guide 270 configured to extend between a circumference of the housing proximal end 160 of the device housing 158 of the gas displacement device 150 and the circumference of the mandrel proximal end 304 when the mandrel 300 is positioned within the outer shell 102. In FIGS. 14-15, the inner gas flow guide 270 is configured to smoothly guide the gas 152 discharged from the gas displacement device 150, and cause the gas 152 to flow along the mandrel backside 312 at a relatively high rate in a controlled manner. In addition, as shown in FIG. 14, the inner gas flow guide 270 may maintain separation between the gas 152 flowing from the gas displacement device 150 toward the first annular gap 256, and the gas 152 flowing out of the second annular gap 260 toward the heat exchanger 200. As mentioned above, the gas 152 in the first annular gap 256 flows generally along an axial direction from the mandrel proximal end 304 to the mandrel distal end 306, and then reverses direction at the hood end wall 226 and flows generally along an axial direction from the mandrel distal end 306 to the mandrel proximal end 304. The inner gas flow guide 270 may be unique to each unique mandrel 300 configuration.

In FIGS. 14-15, the inner gas flow guide 270 and the housing extension 274 may confine the gas 152 flowing from the gas displacement device 150 to the first annular gap 256. The inner gas flow guide 270 may have a curved or radiused cross-sectional profile. The upper circumferential edge of the inner gas flow guide 270 may be mated to or abutted against the lower circumferential edge of the mandrel 300. In some examples, the upper circumferential edge of the inner gas flow guide 270 may be approximately tangent to the mandrel partside 310 of the mandrel 300 to provide a continuous surface for smoothly directing the gas 152 upwardly into the first annular gap 256. In this regard, the inner gas flow guide 270 smoothly direct the gas 152 to flow along a direction parallel to the mandrel backside 312 such that the gas 152 may attach to and flow along the mandrel backside 312 at a high rate in a controlled manner for uniform heating of the mandrel 300.

FIGS. 14-15 additionally illustrate an annular outer gas flow guide 272 configured to extend from a circumference of the proximal end of the heat exchanger housing 202 to the circumference of the hood second wall 224 of the hood system 220 when installed over the mandrel 300. The upper circumferential edge of the outer gas flow guide 272 may be mated to or abutted against the lower circumferential edge of the hood second wall 224. The inner gas flow guide 270 and the outer gas flow guide 272 may collectively confine the gas 152 flowing from the second annular gap 260 to the heat exchanger 200. The outer gas flow guide 272 may have a curved cross-sectional profile having an upper circumferential edge that may be approximately tangent to the lower circumferential edge of the hood second wall 224 to provide a continuous surface for smoothly directing the gas 152 from the second annular gap 260 to the heat exchanger 200. Similar to the inner gas flow guide 270, the outer gas flow guide 272 may be unique to each unique hood system 220 configuration. When the mandrel 300 and the hood system 220 are in position over the gas displacement device 150 and the first shell portion 106 (e.g., upper shell portion) is mated to the second shell portion 108 (e.g., lower shell portion) as shown in FIG. 14, the inclusion of the inner gas flow guide 270 and the outer gas flow guide 272 may result in a closed-loop path gas circulation path 250 in which the gas 152 circulates through the heat exchanger 200, the gas displacement device 150, the first annular gap 256, and the second annular gap 260, before returning to the heat exchanger 200 for reconditioning (e.g., heating or cooling) followed by the gas 152 flowing into the gas displacement device 150 for recirculation.

Figure 18:
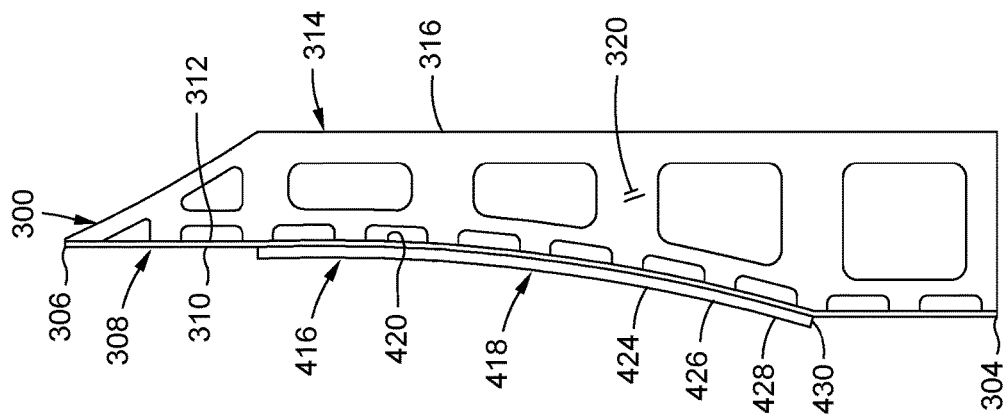
FIG. 18 is a side sectional view of the mandrel taken along line 18 of FIG. 17.
Figure 17:
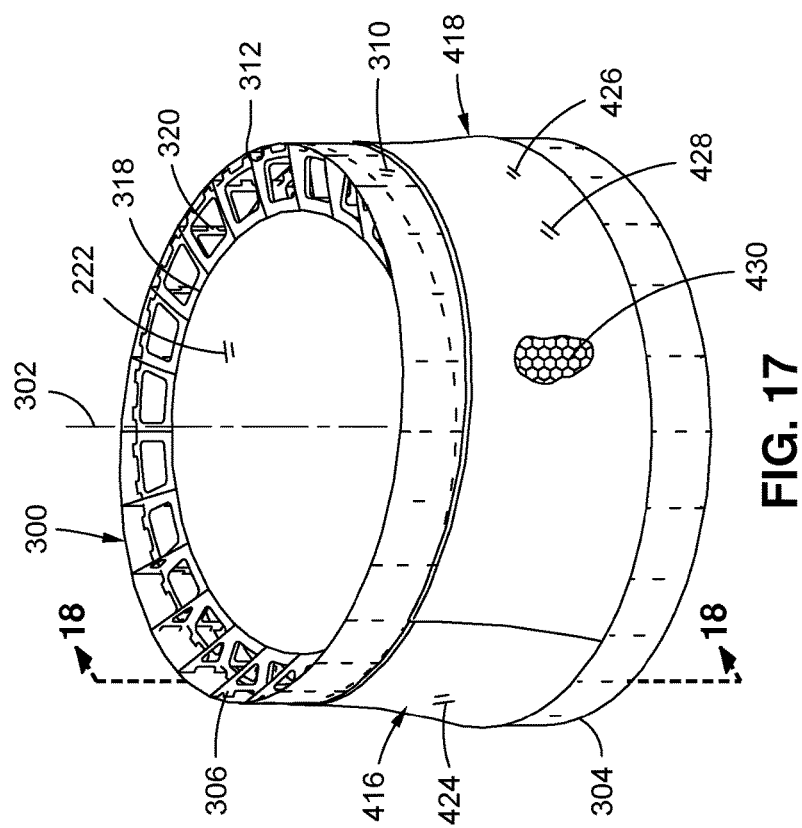
FIG. 17 is a perspective view of the mandrel of FIG. 15 showing the mandrel reinforcing structure including a mandrel circumferential wall mounted in spaced relation to the mandrel backside.

Referring to FIGS. 17-18, shown is the mandrel 300 of FIGS. 15-16 and in which the mandrel reinforcing structure 314 has a mandrel circumferential wall 316. The mandrel circumferential wall 316 may be coupled to the mandrel backside 312 by a plurality of axially-spaced circumferential frames 318 and a plurality of circumferentially-spaced axial frames 320. The axially-spaced circumferential frames 318 and the circumferentially-spaced axial frames 320 may have holes or openings to allow the gas 152 to flow through the first annular gap 256 shown in FIG. 14. The mandrel circumferential wall 316 in combination with the mandrel backside 312 defines the first annular gap 256 for guiding the flow of gas 152 along the mandrel backside 312. In addition, the mandrel circumferential wall 316 in combination with the circumferential frames 318 and the axial frames 320 increases the strength and stiffness of the mandrel 300 and may reduce thermal distortion of the mandrel 300 during heating and/or cooling of the mandrel 300 during processing of a workpiece 418. As described above, the mandrel circumferential wall 316 functions as the lower portion of the hood first wall 222 (e.g., the hood inner wall). However, in an embodiment not shown, the mandrel circumferential wall 316 may be omitted from the mandrel reinforcing structure 314, and the hood system 220 may be provided with a hood first wall 222 configured to be placed either in contact with or in radially spaced relation to the radially inner edges of the axially-spaced circumferential frames 318 and the circumferentially-spaced axial frames 320 of the mandrel reinforcing structure 314.

Referring to FIGS. 19-20, shown is a further embodiment of the workpiece heating system 100 configured to receive a mandrel 300 for which the mandrel partside 310 is located radially inboard of the mandrel backside 312, as distinguished from the embodiments of FIGS. 9 and 13 which are configured to receive a mandrel 300 for which the mandrel partside 310 is located radially outboard of the mandrel backside 312. In FIGS. 19-20, the workpiece 418 is supported on the radially inner side of the mandrel 300 such that the workpiece 418 has an outer mold line 422 on the radially outer side of the workpiece 418. As mentioned above, a mold line is the surface of the workpiece 418 that is in contact with the mandrel partside 310.

In FIGS. 19-21, the gas displacement device 150 is located below the heat exchanger 200, resulting in the gas flow direction in FIG. 19 being opposite the gas flow direction shown in FIGS. 6, 13, and 14. In FIGS. 19-21, the hood first wall 222 is located radially outboard of the hood second wall 224. FIG. 20 illustrates the hood system 220 as a unitary structure including the hood first wall 222 and the hood second wall 224 interconnected by the hood end wall 226, as described above. The hood first wall 222 and the mandrel backside 312 collectively define the first annular gap 256. The hood second wall 224 and the mandrel partside 310 (and workpiece) collectively define the second annular gap 260. As described above with regard to the embodiment of FIG. 13, the hood first wall 222 and the hood second wall 224 in FIG. 19-21 may be contoured in a manner to respectively maintain a desired wall-partside spacing 230 and a wall-backside spacing 228 that may be dictated in part by the volumetric flow rate of the gas 152, flow attachment to the mandrel 300 and/or workpiece 418, target gas velocity, and other above-mentioned parameters.

In FIG. 19, an annular outer gas flow guide 272 may optionally be included between the circumference of the housing proximal end 160 of the device housing 158 of the gas displacement device 150 and the circumference of the hood first wall 222 (e.g., the hood outer wall). In addition, an annular inner gas flow guide 270 may optionally be included between the circumference of the proximal end of the heat exchanger housing 202 and the circumference of the mandrel proximal end 304 when the mandrel 300 is positioned within the outer shell 102. The inner gas flow guide 270 and the outer gas flow guide 272 confine the gas 152 flowing from the outer circumferential exit 166 of the gas displacement device 150 to the first annular gap 256 between the hood first wall 222 and the mandrel backside 312. In addition, the inner gas flow guide 270 and the outer gas flow guide 272 smoothly guide the gas 152 into a direction parallel to the mandrel backside 312 such that the gas 152 attaches to and/or flows over the mandrel backside 312 as the gas 152 flows through the first annular gap 256.

In FIG. 19, an annular housing extension 274 may optionally be included between the outer perimeter of the heat exchanger housing 202 and the proximal end of the hood second wall 224 (e.g., the hood inner wall) to close any annular gap that may otherwise exists between the mandrel proximal end 304 and the heat exchanger housing 202. The inner gas flow guide 270 and the housing extension 274 confine the gas 152 flowing from the second annular gap 260 to the heat exchanger 200. The outer gas flow guide 272, the inner gas flow guide 270, and the housing extension 274 may be configured as described above for the embodiment shown in FIG. 14, and collectively enclose the gas 152 in a closed-loop gas circulation path 250 that may improve the efficiency and rate of heating or cooling of the mandrel 300 and workpiece 418 relative to a conventional autoclave (not shown).

In FIG. 19, the distal end (e.g., the upper end) of the heat exchanger housing 202 is located approximately flush with the mandrel proximal end 304, and the gas displacement device 150 is located below the heat exchanger 200. Similar to the above-described arrangement of FIG. 14, the gas displacement device 150, the heat exchanger 200, and optionally the housing extension 274, outer gas flow guide 272, and inner gas flow guide 270 may be mounted within the second shell portion 108 (e.g., the lower shell portion) flush with or slightly below the shell joint 118 between the first shell (e.g., the upper shell portion) and the second shell portion 108. As mentioned above, by locating the above-noted components (e.g., heat exchanger 200, gas displacement device 150) at or below the level of the shell joint 118, the mandrel 300 may be translated horizontally into position over such components, thereby avoiding the need to vertically lift the mandrel 300 and vertically lower and manipulate the mandrel 300 into position around the components (e.g., heat exchanger 200, gas displacement device 150) as may otherwise be required if the components protruded above the shell joint 118.

Figure 23:
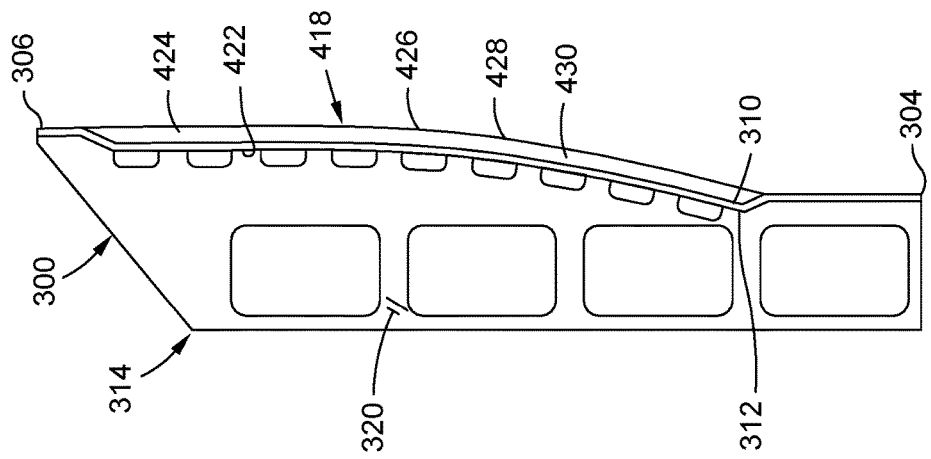
FIG. 23 is a side sectional view of the mandrel taken along line 23 of FIG. 22.
Figure 22:
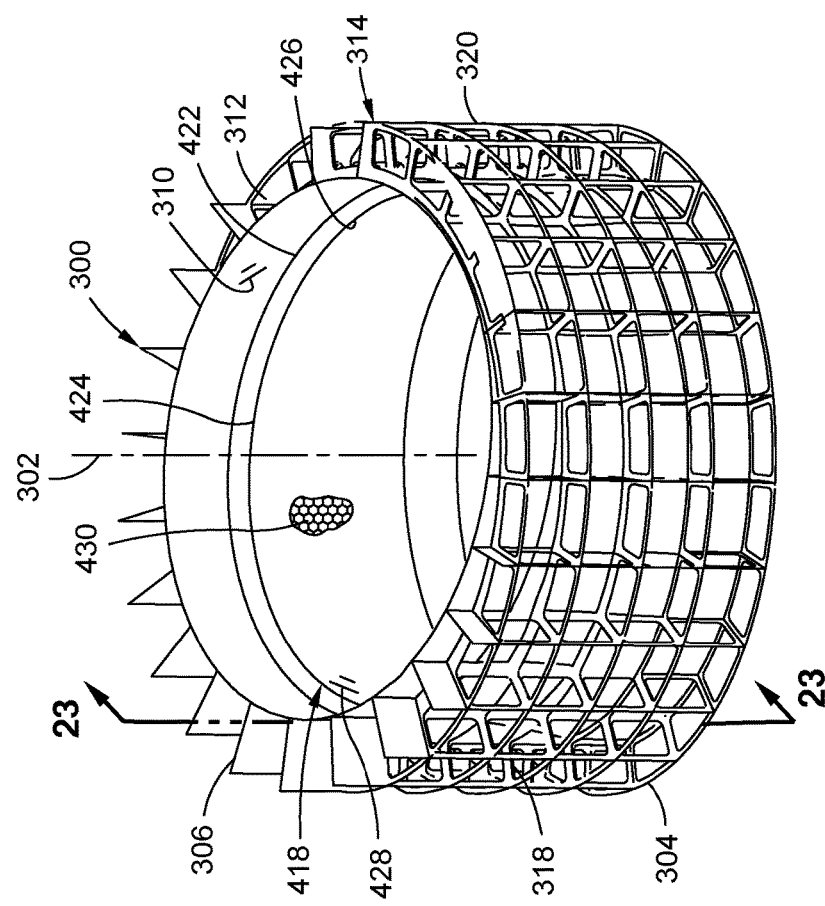
FIG. 22 is a perspective view of the mandrel of FIG. 20 showing the workpiece supported on the mandrel partside on a radially inner side of the mandrel and further illustrating the mandrel reinforcing structure coupled to the mandrel backside on a radially outer side of the mandrel.

Referring to FIGS. 22-23, shown is the mandrel reinforcing structure 314 of the mandrel 300 including a plurality of axially-spaced circumferential frames 318 and a plurality of circumferentially-spaced axial frames 320 that are coupled to the mandrel backside 312. As mentioned above, the mandrel reinforcing structure 314 may increase the strength and stiffness of the mandrel 300 and thereby reduce thermal distortion of the mandrel 300 during heating and/or cooling of the mandrel 300. Although the mandrel 300 is shown without a mandrel circumferential wall 316, the mandrel 300 may optionally be provided with a mandrel circumferential wall 316 to increase the stiffness of the mandrel 300 and also to serve as at least a portion of the hood first wall 222 (e.g., the hood outer wall).

Figure 24:
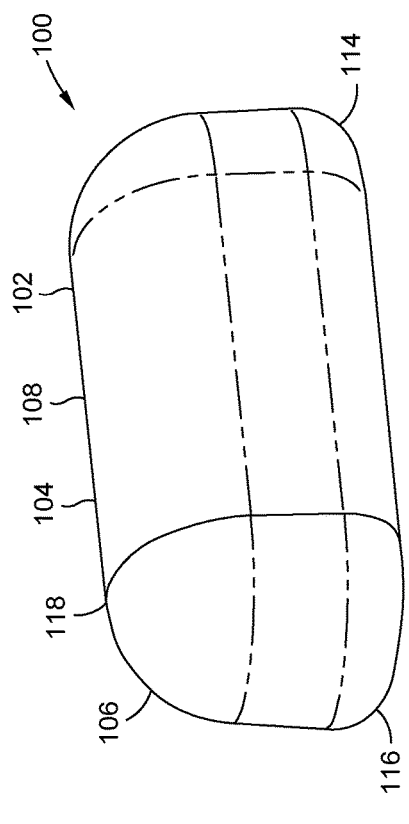
FIG. 24 is a perspective view of a further example of a workpiece heating system having an outer shell oriented generally horizontally and including a first shell portion joined to a second shell portion along a shell joint.
Figure 25:
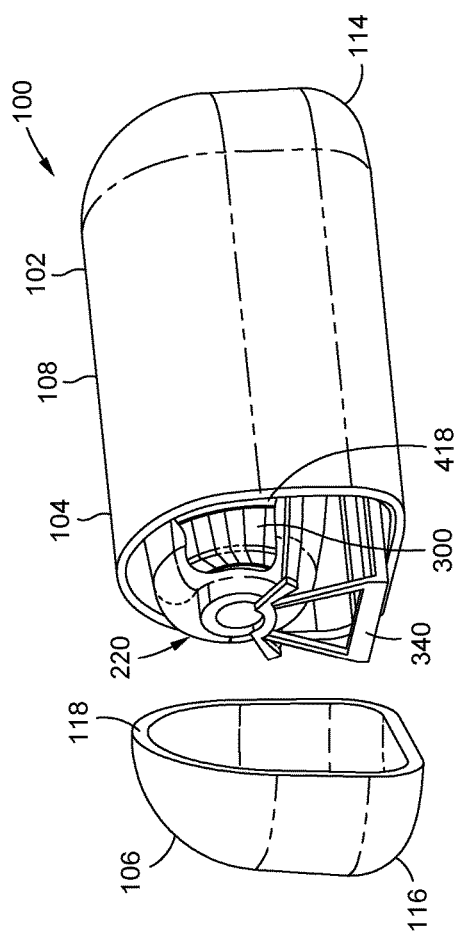
FIG. 25 is a perspective view of the workpiece heating system of FIG. 24 showing the first shell portion separated from the second shell portion to illustrate a generally horizontally oriented mandrel supporting a workpiece.

Referring to FIGS. 24-25, shown is a further example of a workpiece heating system 100 in a longitudinal configuration. The outer shell 102 is oriented, sized, and configured to enclose a generally elongate mandrel 300 and workpiece 418 and hood system 220 in a generally horizontal orientation. Although the outer shell 102 is shown having a non-cylindrical cross-sectional shape as may be implemented for non-pressurized operation of the workpiece heating system 100, the outer shell 102 may preferably be provided in a cylindrical cross-sectional shape for pressurized operations. The mandrel 300 may be sized and configured for manufacturing an elongate hollow workpiece 418. For example, the mandrel 300 may be configured to support a layup of composite plies for a fuselage barrel section 404 (FIG. 1) that may be cured using the workpiece heating system 100.

In FIGS. 24-25, the outer shell 102 includes a first shell portion 106 mateable to a second shell portion 108 along a shell joint 118. The first shell portion 106, second shell portion 108, and shell joint 118 may be configured in any of the above-described embodiments. For example, although FIG. 25 shows the first shell portion 106 completely detached from second shell portion 108, in an embodiment not shown, the first shell portion 106 may be hingedly coupled to the second shell portion 108 to allow the first shell portion 106 to be pivoted open to provide access to the interior of the workpiece heating system 100. In this manner, the second shell portion 108 may receive the mandrel 300 with the mandrel axis 302 oriented approximately horizontally. For example, the mandrel 300 and workpiece 418 may be supported on a mandrel support frame 340 that may be fitted with wheels (not shown) to allow the mandrel support frame 340 supporting the mandrel 300 and hood system 220 to be translated on a factory floor and inserted into the interior of the second shell portion 108. Once the mandrel support frame 340 and mandrel 300 and hood system 220 are positioned inside the second shell portion 108, the first shell portion 106 may be mated to the second shell portion 108 at the shell joint 118.

Referring to FIG. 26, shown is the first shell portion 106 mated to the second shell portion 108 to enclose the mandrel support frame 340 supporting the mandrel 300 and workpiece 418. The outer shell 102 may optionally include a layer of thermal insulation (not shown) along the inner surface of the outer shell 102, similar to the above-described thermal insulation 120 shown in FIGS. 6, 14, and 19. The mandrel support frame 340 may have a base 342 and a plurality of struts 344 extending upwardly from the base 342 to a proximal support hub 346 and a distal support hub 348. The mandrel 300 may be hollow at least on the mandrel proximal end 304 and on the mandrel distal end 306 for respectively receiving the proximal support hub 346 and the distal support hub 348 of the mandrel support frame 340.

Figure 27:
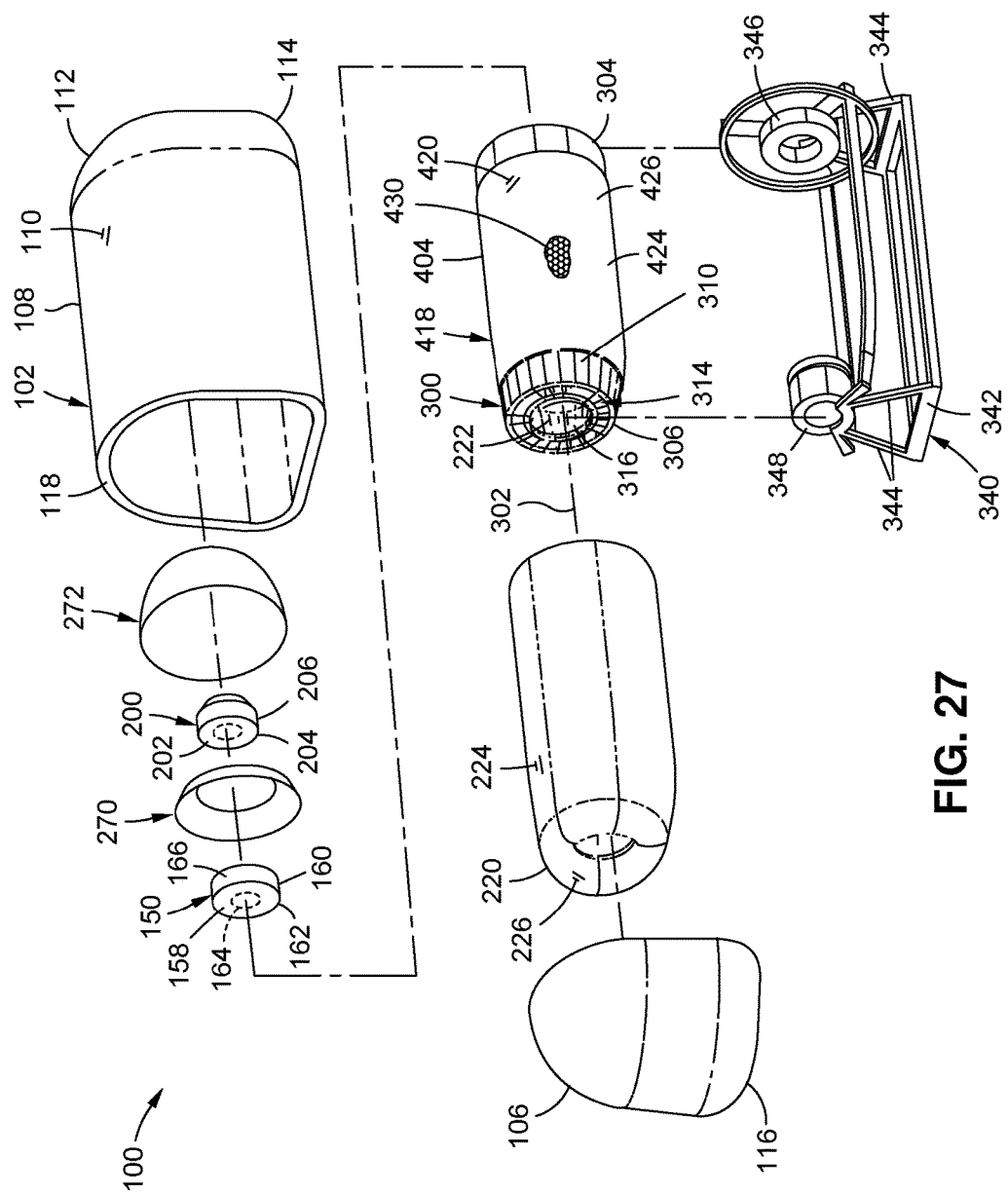
FIG. 27 is an exploded perspective view of the workpiece heating system of FIG. 25 and illustrating the generally horizontal orientation of the mandrel.

In FIG. 26-27, the workpiece heating system 100 may be configured similar to the above-described embodiment of the workpiece heating system 100 shown in FIG. 14. In this regard, the workpiece heating system 100 of FIG. 26 may be configured to receive a mandrel 300 having a mandrel circumferential wall 316 coupled to the mandrel backside 312 by a plurality of axially-spaced circumferential frames 318 and a plurality of circumferentially-spaced axial frames 320 having holes, gaps, or openings allowing the gas 152 to flow through the first annular gap 256 between the mandrel circumferential wall 316 and the mandrel backside 312. The mandrel circumferential wall 316 functions as the hood first wall 222 (e.g., the hood inner wall) of the hood system 220 of FIG. 26. The hood system 220 further includes a hood second wall 224 (e.g., the hood outer wall) and a hood end wall 226. The hood second wall 224 and the hood end wall 226 may be formed as a unitary structure that is supported at axially opposite ends by the proximal support hub 346 and the distal support hub 348 of the mandrel support frame 340.

The workpiece heating system 100 of FIG. 26-27 includes a gas displacement device 150 and a heat exchanger 200 located aft of the gas displacement device 150. The gas displacement device 150 and heat exchanger 200 may be fixedly coupled to the aft end of the second shell portion 108. The workpiece heating system 100 may optionally include an annular outer gas flow guide 272 and/or an annular inner gas flow guide 270. The outer gas flow guide 272 may be fixedly coupled to the heat exchanger 200 and/or to the aft end of the second shell portion 108. The inner gas flow guide 270 may be fixedly coupled to the gas displacement device 150.

In FIG. 26, the gas displacement device 150 and heat exchanger 200 may be mounted within the second shell portion 108 such that when the mandrel support frame 340 is positioned inside the second shell portion 108, the proximal support hub 346 may be placed into contact with or butted up against the device housing 158 of the gas displacement device 150. If included with the workpiece heating system 100 of FIG. 26, the circumferential edge of the outer gas flow guide 272 may be configured to align with and/or engage with the circumferential edge of the hood outer wall (e.g., hood second wall 224) to form a smooth flow path for the gas 152. Likewise, the circumferential edge of the inner gas flow guide 270 may be configured to align with and/or engage with the circumferential edge of the mandrel proximal end 304 of the mandrel partside 310. Similar to the above-described arrangement shown in FIG. 14, the mandrel circumferential wall 316 and the mandrel backside 312 in FIG. 26 collectively define the first annular gap 256 configured to receive gas 152 discharged from the outer circumferential exit 166 of the gas displacement device 150 and direct the gas 152 over the mandrel backside 312. The hood second wall 224 and the mandrel partside 310 (and workpiece) collectively define the second annular gap 260 configured to receive the gas 152 from the first annular gap 256, and direct the gas 152 over the mandrel partside 310 and the workpiece 418 and back toward the heat exchanger 200 for condition and then to the gas displacement device 150 for recirculation.

In any one of the embodiments disclosed herein, the workpiece heating system 100 may be sized and configured to enclose a single mandrel 300 and associated workpiece 418. Alternatively, any one of the workpiece heating system 100 embodiments may be sized and configured to enclose a family (not shown) of similarly-sized and/or similarly-shaped mandrels 300 and associated workpieces 418. For example, a workpiece heating system 100 may be configured to enclose a family of similarly-shaped mandrels 300 one at a time. In another embodiment, a workpiece heating system 100 may be configured to simultaneously enclose multiple workpieces 418 (not shown) supported on a single mandrel 300. In a still further embodiment, a workpiece heating system 100 may be configured to enclose a plurality of mandrels (not shown) each supporting one or more workpieces 418. For example, a workpiece heating system 100 may be configured to enclose a plurality of generally cylindrical mandrels that are arranged end-to-end inside the workpiece heating system 100.

The workpiece heating system 100 may optionally include the capability for monitoring the temperature of the mandrel 300, the workpiece 418 and/or the system components (e.g., gas displacement device 150, heat exchanger 200, etc.) of the workpiece heating system 100. For example, the workpiece heating system 100 may include or may be configured to accommodate temperature sensors (not shown) mounted at different locations on the workpiece 418 and/or the mandrel 300, the outer shell 102, the hood system 220, or any other component to facilitate the direct or indirect sensing of the temperature of the workpiece 418 or mandrel 300 such as during processing of the workpiece 418. Temperature sensors may be communicatively coupled to a controller (not shown) of the heat exchanger 200 for controlling the heat exchanger 200 in a manner to maintain the temperature of the workpiece 418 within a predetermined range during processing of the workpiece 418. Pressure sensors (not shown) such as pressure transducers maybe mounted on the workpiece 418 and may be coupled to a controller (not shown) for controlling the vacuum source 360 and/or the positive pressure source 370 for regulating the magnitude of the compaction pressure applied to the workpiece 418. Alternatively or additionally, the workpiece heating system 100 may include the capability for monitoring autoclave pressure inside the outer shell 102, and/or monitoring workpiece vacuum bag level inside a vacuum bag 362 (FIG. 11) covering the workpiece 418. For example, the vacuum level inside the vacuum bag 362 may be monitored outside of the outer shell 102 using a dead-ended hose (not shown) communicating the vacuum level inside the vacuum bag 362 to an external sensor or gauge (not shown).

Figure 28:
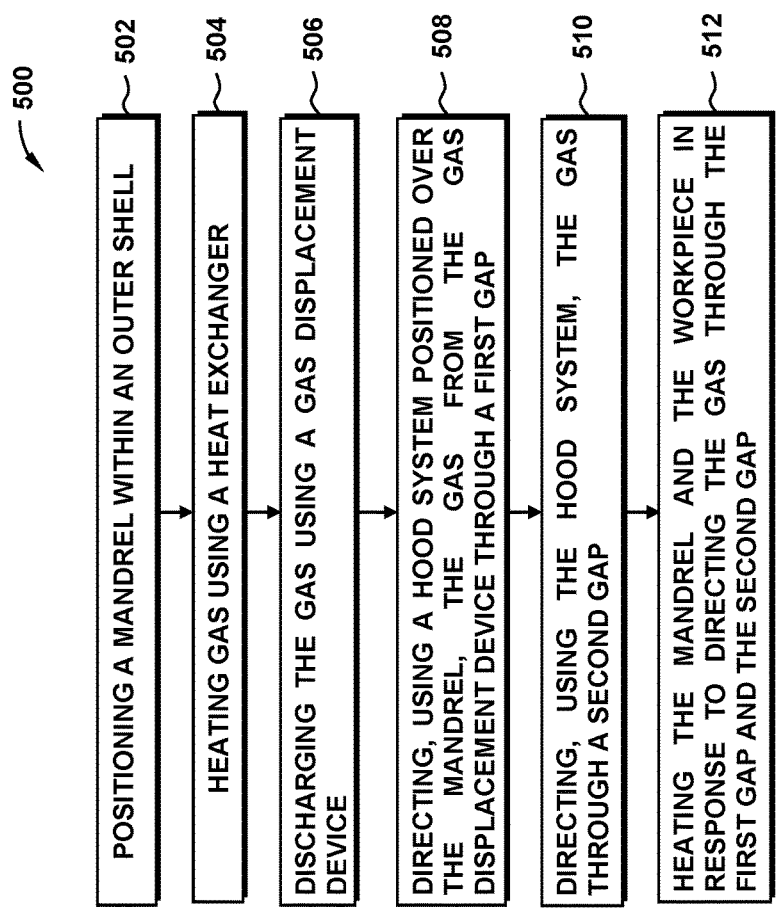
FIG. 28 is a flowchart of operations included in a method of heating a workpiece using the presently-disclosed workpiece heating system.

Referring to FIG. 28 shown is a flowchart of operations included in a method 500 of heating a workpiece 418 using the presently-disclosed workpiece heating system 100. The method 500 is described in the context of the workpiece heating system 100 shown in FIG. 29-32 which is similar to the above-described embodiment of the workpiece heating system 100 shown in FIGS. 14-18.

Figure 29:
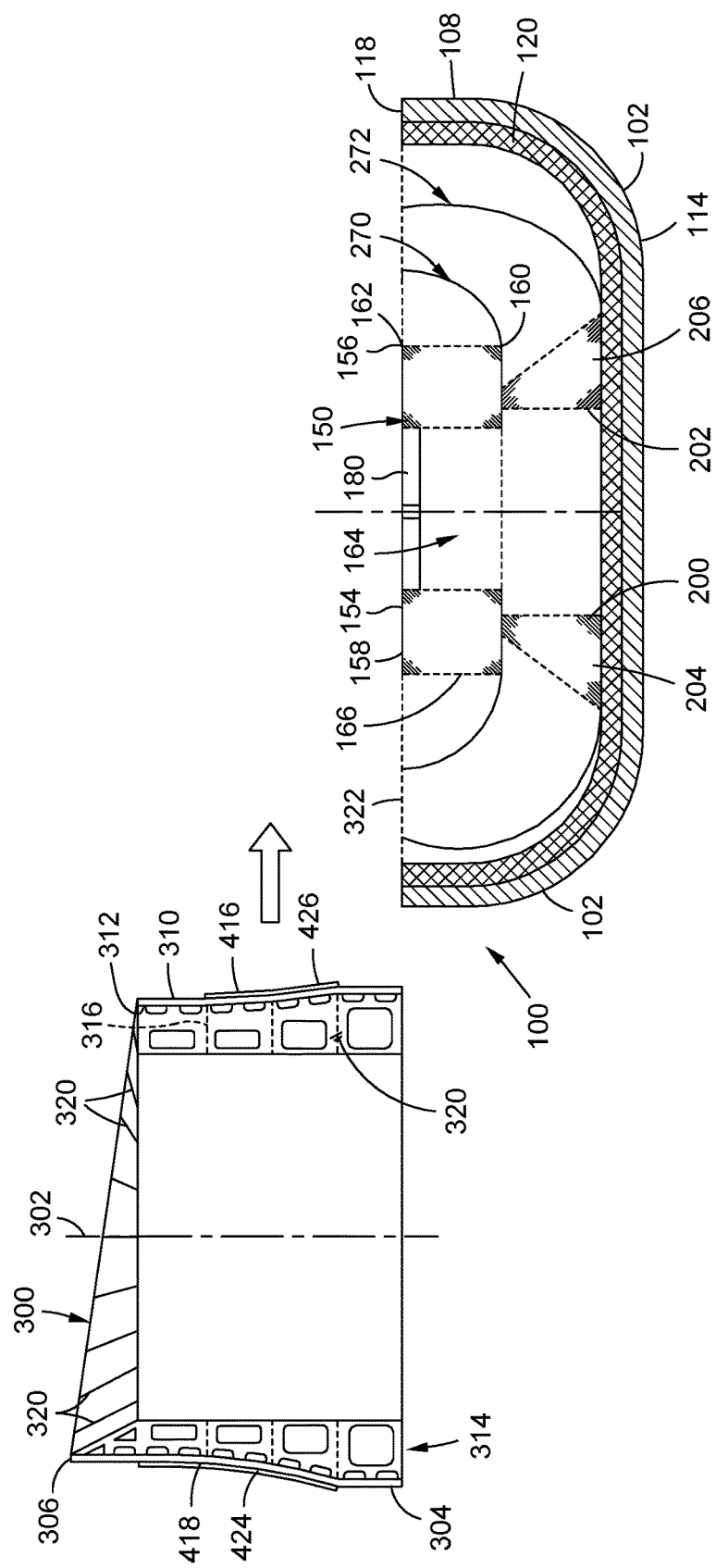
FIG. 29 is a partially exploded side sectional view of the workpiece heating system of FIG. 14 and illustrating the positioning of the mandrel and workpiece within the outer shell.

Referring to FIG. 29, step 502 of the method 500 includes positioning the mandrel 300 within an outer shell 102 of the workpiece heating system 100. As described above with regard to the embodiment of FIG. 14, the mandrel 300 has a mandrel proximal end 304 and a mandrel distal end 306 and a mandrel axis 302. In addition, the mandrel 300 includes a mandrel 300 having a mandrel partside 310 supporting a workpiece 418, and a mandrel backside 312 opposite the mandrel partside 310. The mandrel 300 may also include a mandrel circumferential wall 316 coupled to the mandrel backside 312 by a plurality of axially-spaced circumferential frames 318 and circumferentially-spaced axial frames 320. As mentioned above, the mandrel circumferential wall 316 may function as a lower portion of the hood first wall 222 a (e.g., hood inner wall).

As shown in FIG. 29, installation of the mandrel 300 may include positioning the mandrel 300 over the gas displacement device 150 by horizontally translating the mandrel 300 into position such that the gas displacement device 150 is generally centered relative to the mandrel 300 when viewed along an axial direction. As mentioned above, the gas displacement device 150 and the heat exchanger 200 may be fixedly mounted to the second shell portion 108 (e.g., the lower shell portion) as may the optional inner gas flow guide 270 and the outer gas flow guide 272. As is also mentioned above, the annular housing extension 274 extends between the gas displacement device 150 and the circumferential edge of the mandrel circumferential wall 316. The upper circumferential edge of the outer gas flow guide 272 may be configured complementary to the lower circumferential edge of the hood second wall 224 (e.g., hood outer wall), and the upper circumferential edge of the inner gas flow guide 270 may be configured complementary to the lower circumferential edge of the mandrel 300, as shown in FIG. 30.

Figure 30:
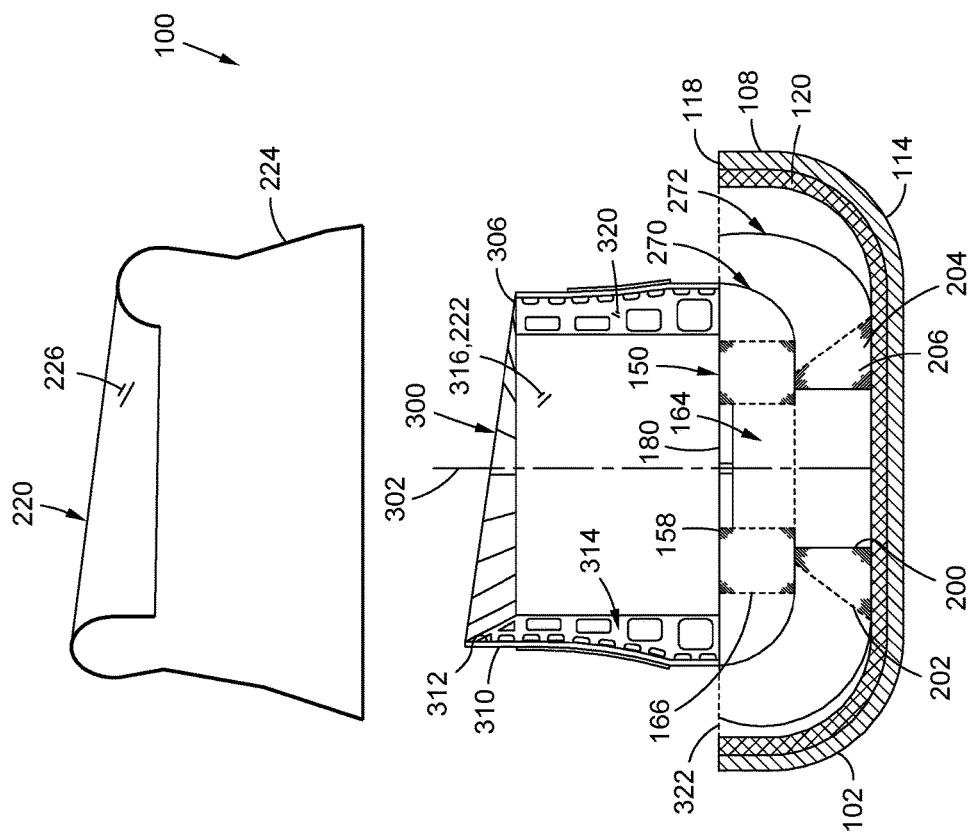
FIG. 30 is a partially exploded side sectional view of the workpiece heating system of FIG. 29 illustrating the positioning of the hood system over the mandrel and workpiece.

FIG. 30 shows the installation of the hood system 220 over the mandrel 300 and workpiece 418. In an embodiment, the hood system 220 be lifted over the mandrel 300 and then lowered into position. In this regard, the system may be positioned such that the lower circumferential edge of the hood second wall 224 (e.g., hood outer wall) is aligned with the upper circumferential edge of the outer gas flow guide 272 and the lower circumferential edge of the hood first wall 222 is aligned with the upper edge of the mandrel circumferential wall 316.

Figure 31:
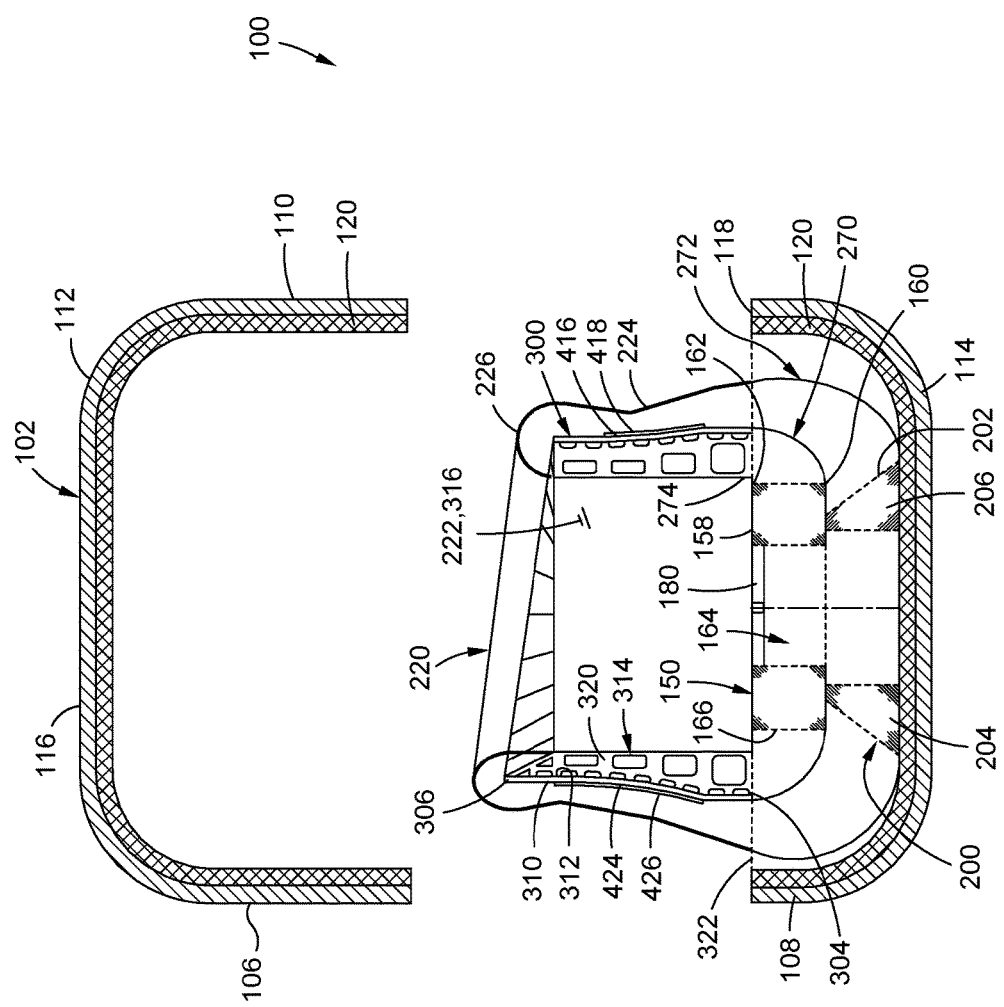
FIG. 31 is a partially exploded side sectional view of the workpiece heating system of FIG. 30 illustrating the assembly of the first shell portion to the second shell portion for enclosing the mandrel, the workpiece, the gas displacement device, the heat exchanger(s), and the hood system.
Figure 32:
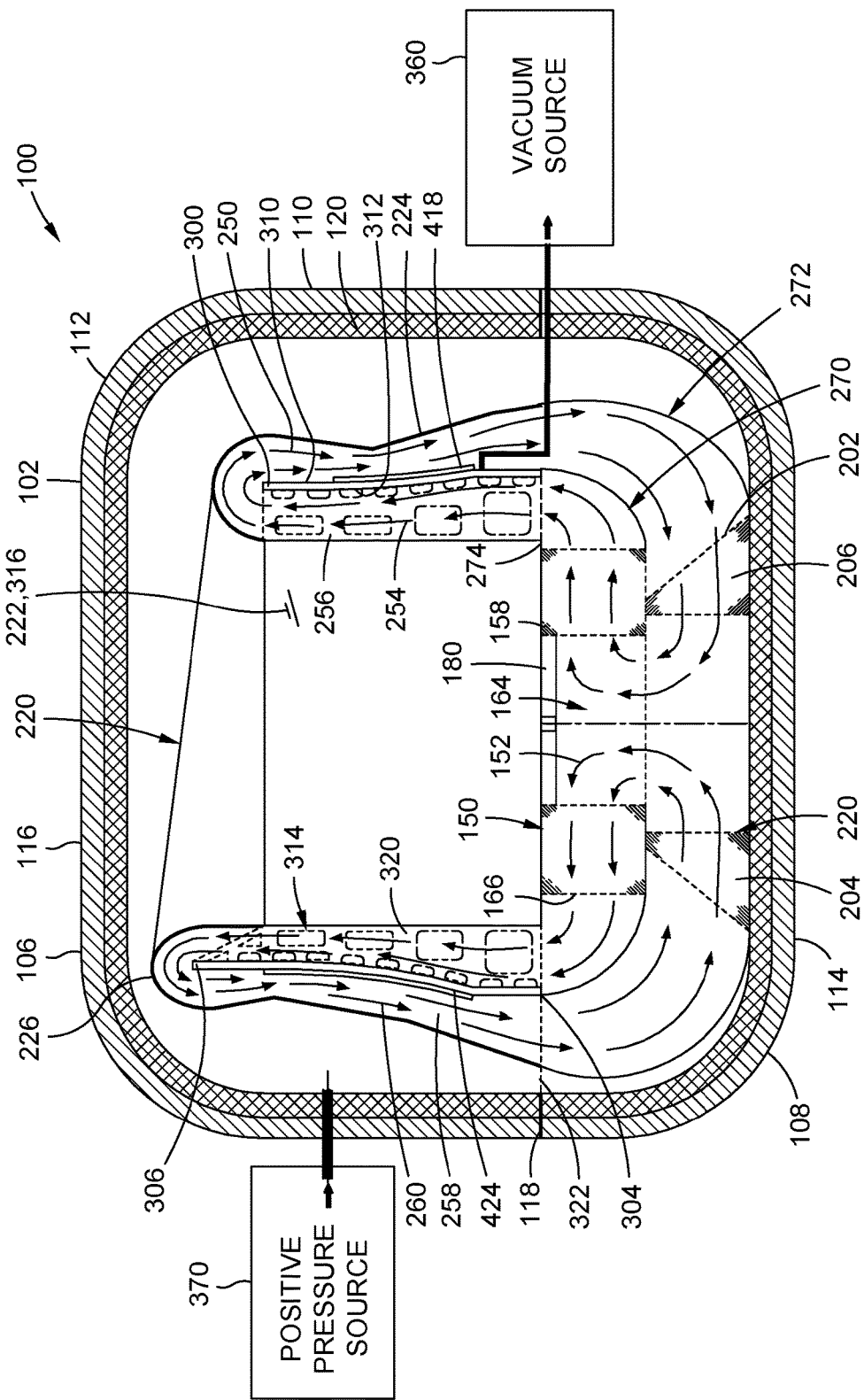
FIG. 32 is a side sectional view of the workpiece heating system of FIG. 31 and illustrating gas flowing along the gas circulation path and further illustrating the application of a vacuum to a vacuum bag (FIG. 11) covering the workpiece, and further illustrating the application of positive pressure to the interior of the workpiece heating system for increasing compaction pressure on the workpiece.

FIG. 31 shows the assembly of the first shell portion 106 with the second shell portion 108. In an embodiment, the first shell portion 106 may be lifted over the hood system 220 and lowered until the first shell portion 106 mates with the second shell portion 108 along the above-described circumferential shell joint 118. As shown in FIG. 32, the assembly of the first shell portion 106 to the second shell portion 108 encloses the mandrel 300 and workpiece 418 along with the hood system 220, the gas displacement device 150, the heat exchanger 200, the outer gas flow guide 272, and the inner gas flow guide 270. Although not shown, the hood system 220 may optionally be fixedly coupled to the first shell portion 106 such that the first shell portion 106 and hood system 220 may be lowered as a unit into position over the mandrel 300 and workpiece 418.

FIG. 32 also shows a vacuum source 360 and a positive pressure source 370 that may optionally be included with the workpiece heating system 100 for applying compaction pressure on the workpiece 418. One or more vacuum lines 366 may extend through the outer shell 102 for fluidly coupling the vacuum bag 362 to one or more of the vacuum sources 360. Each vacuum source 360 may evacuate the vacuum bag 362 and thereby generate compaction pressure (e.g., atmospheric pressure) onto the workpiece 418 against the mandrel 300. The application of a vacuum to the vacuum bag 362 may also draw out of the workpiece 418 air, moisture, and/or volatiles that may be generated during consolidation and/or curing of the workpiece 418. For embodiments of the workpiece heating system 100 for which the outer shell 102 is configured to be pressurized, the workpiece heating system 100 may include one or more positive pressure sources 370 fluidly couplable to the interior of the outer shell 102. In such an arrangement, the shell joint 118 may be configured to seal the first shell portion 106 to the second shell portion 108 in a manner allowing the interior of the outer shell 102 to be positively pressurized for increasing compaction pressure on a workpiece 418.

Referring still to FIG. 32, step 504 of the method 500 includes heating the gas 152 within the interior of the outer shell 102 using at least one heat exchanger 200. As mentioned above, the heat exchanger 200 may include one or more heating devices 204 configured in any one a variety of different configurations including, but not limited to, an electric heater containing electrical-resistance heating elements (not shown), and/or as a heater containing heat transfer tubes (not shown) for circulating a fluid medium such as steam, hot water or oil. The heat exchanger 200 may be configured to heat the gas 152 in a manner that allows for rapid heating of the workpiece 418 to the desired processing temperature and at the desired ramp rate. As mentioned above, the heat exchanger 200 may optionally include one or more cooling devices 206 for actively cooling the workpiece 418 at the conclusion of one or more temperature holds of a cure cycle. Advantageously, such cooling devices 206 may allow for reducing workpiece 418 temperature at a specified cooldown rate, which may also have the effect of reducing the overall cure cycle time.

As shown in FIG. 32, step 506 of the method 500 includes discharging gas 152 using a gas displacement device 150 mounted within the outer shell 102 and located downstream of the heat exchanger 200. The gas displacement device 150 includes a central intake 164 which may be fluidly coupled to the heat exchanger 200. Gas 152 conditioned by the heat exchanger 200 enters the central intake 164 and is accelerated by the gas displacement device 150 and discharged radially outwardly from the outer circumferential exit 166. The gas 152 may be discharged generally uniformly 360° around the outer circumferential exit 166 toward the mandrel backside 312. The inner gas flow guide 270 may guide the gas 152 toward the inlet of the first annular gap 256 which, in the example shown, is defined between the mandrel backside 312 and the mandrel circumferential wall 316 which functions as the hood first wall 222 of the hood system 220. The gas 152 from the gas displacement device 150 initially impinges and/or flows along the mandrel backside 312.

Step 508 of the method 500 includes directing the gas 152 from the gas displacement device 150 in a generally axial direction through the first annular gap 256 along the first flow path segment 254 of the gas circulation path 250. As described above, the first flow path segment 254 extends from the mandrel proximal end 304 to the mandrel distal end 306. As the gas 152 flows through the first annular gap 256, the gas 152 flows over the mandrel backside 312 resulting in convective heating of the mandrel 300 uniformly along the entire circumference of the mandrel backside 312. The annular hood end wall 226 at the proximal end of the hood system 220 smoothly reverses the flow direction of the gas 152 flowing out of the first annular gap 256, as shown in FIG. 32.

Step 510 of the method 500 includes directing the gas 152 in a generally axial direction through the second annular gap 260 defined between the hood second wall 224 (e.g., the hood outer wall) and the mandrel partside 310 (and workpiece) along the second flow path segment 258 of the gas circulation path 250. As described above, the second flow path segment 258 extends from the mandrel distal end 306 to the mandrel proximal end 304. For the workpiece heating system 100 embodiments shown in FIGS. 6, 13, 14, 26, and 32 in which the hood first wall 222 is located radially inboard of the hood second wall 224 and the mandrel partside 310 is located radially outboard of the mandrel backside 312, step 508 of directing the gas 152 through the first annular gap 256 comprises directing the gas 152 through the first annular gap 256 located radially inboard of the mandrel 300, and step 510 of directing the gas 152 through the second annular gap 260 comprises directing the gas 152 through the second annular gap 260 located radially outboard of the mandrel 300. However, for the workpiece heating system 100 embodiment shown in FIG. 19 in which the hood first wall 222 is located radially outboard of the hood second wall 224, and the mandrel partside 310 is located radially inboard of the mandrel backside 312, step 508 of directing the gas 152 through the first annular gap 256 comprises directing the gas 152 through the first annular gap 256 located radially outboard of the mandrel 300, and step 510 of directing the gas 152 through the second annular gap 260 comprises directing the gas 152 through the second annular gap 260 located radially inboard of the mandrel 300.

Step 512 of the method 500 includes heating the mandrel 300 in response to directing the gas 152 through the first annular gap 256 and the second annular gap 260 and heating the workpiece 418 at least partially in response to the gas 152 heating the mandrel 300. As mentioned above, as the heated gas 152 from the gas displacement device 150 impinges on the mandrel backside 312 and flows axially through the first annular gap 256 and attaches to and/or passes over the mandrel backside 312, the heated gas 152 convectively heats the mandrel 300. The heat in the mandrel 300 is conducted into the workpiece 418 which results in heating of the workpiece 418. In addition, as the heated gas 152 flows axially through the second annual gap and passes over the mandrel partside 310 and workpiece 418, the gas 152 further convectively heats the workpiece 418.

As indicated above, the workpiece heating system 100 may optionally include an annular housing extension 274 and an annular inner gas flow guide 270. In such an arrangement, the method 500 may include confining the gas 152 discharged from the gas displacement device 150 to the area between the inner gas flow guide 270 and the housing extension 274. In addition, the method 500 may include maintaining, using the inner gas flow guide 270, separation between the gas 152 flowing from the gas displacement device 150 toward the first annular gap 256 and the gas 152 flowing in an opposite direction from the second annular gap 260 toward the heat exchanger 200. For embodiments of the workpiece heating system 100 having an outer gas flow guide 272, the method 500 may further include confining the gas 152 between the inner gas flow guide 270 and the outer gas flow guide 272. By including the housing extension 274, inner gas flow guide 270, and the outer gas flow guide 272, the workpiece heating system 100 defines a closed-loop gas circulation path 250 which may improve the efficiency with which the temperature of the workpiece 418 may be controlled.

As indicated above, the workpiece heating system 100 may optionally include a positive pressure source 370 which may allow the workpiece heating system 100 to be operated as an autoclave. The positive pressure source 370 may comprise a compressor (not shown) configured to pump air, nitrogen, or other gas composition into the interior of the outer shell 102. In such an arrangement, the method 500 may include pressurizing the interior of the outer shell 102. The interior of the outer shell 102 may be pressurized during or after the optional application of a vacuum to an optional vacuum bag 362 (FIG. 11) sealing the workpiece 418 to the mandrel 300. The positive pressure source 370 may facilitate the application of elevated compaction pressure (i.e., above atmospheric pressure) onto the workpiece 418 against the mandrel partside 310. However, as indicated above, the workpiece heating system 100 may be operated without the application of positive pressure. In such an arrangement, the workpiece heating system 100 may be operated as an oven for heating and/or cooling a workpiece 418 with or without a vacuum bag 362 sealing the workpiece 418 to the mandrel 300.

The presently-disclosed workpiece heating system 100 advantageously can allow for rapid loading and unloading of mandrels 300 and associated workpieces 418. In addition, the workpiece heating system 100 impinges gas 152 directly on the mandrel backside 312 and/or the gas 152 attaches to and flows along the mandrel backside 312 which can significantly increase heat transfer to a workpiece 418 relative to a conventional autoclave, and thereby reduces overall cure cycle time. In this regard, a plurality of the presently-disclosed workpiece heating systems 100 may collectively process a greater quantity of individual workpieces 418 at a lower cost and at a faster production rate than would be achievable by batch processing multiple workpieces 418 using a single large autoclave. Furthermore, the workpiece heating system 100 may be fabricated off-site and transported over highways to a workpiece production facility, thereby avoiding the high manufacturing and installation costs associated with fabricating a large autoclave on-site using heavy equipment and specialized installation techniques.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A workpiece heating system for heating a workpiece supported on a mandrel, comprising:
    an outer shell configured to enclose the mandrel removably positionable within the outer shell, the mandrel having a mandrel proximal end, a mandrel distal end, a mandrel partside configured to support a workpiece, and a mandrel backside opposite the mandrel partside;
    a gas displacement device mounted within the outer shell and having an outer circumferential exit configured to discharge a gas toward the mandrel backside;
    at least one heat exchanger mounted within the outer shell upstream of the gas displacement device and configured to heat the gas prior to entering the gas displacement device;
    a hood system having a hood first wall and a hood second wall each configured to extend circumferentially in radially spaced relation to each other and in radially spaced relation respectively to the mandrel backside and the mandrel partside when the mandrel is positioned within the outer shell;
    the hood first wall and the mandrel backside collectively defining a first annular gap configured to receive the gas discharged from the gas displacement device and direct the gas in a generally axial direction along a first flow path segment from the mandrel proximal end to the mandrel distal end; and
    the hood second wall and the mandrel partside collectively defining a second annular gap configured to receive the gas from the first annular gap and direct the gas in a generally axial direction along a second flow path segment from the mandrel distal end to the mandrel proximal end.

2. The workpiece heating system of claim 1, wherein:
    the hood first wall is located radially inboard of the hood second wall; and
    the mandrel partside is located radially outboard of the mandrel backside.

3. The workpiece heating system of claim 1, wherein:
    the hood first wall is located radially outboard of the hood second wall; and
    the mandrel partside is located radially inboard of the mandrel backside.

4. The workpiece heating system of claim 1, wherein:
    the mandrel includes a mandrel circumferential wall located in spaced relation to the mandrel backside; and
    the mandrel circumferential wall comprising at least a portion of the hood first wall.

5. The workpiece heating system of claim 1, further including:
    an annular inner gas flow guide configured to extend between a distal end of the gas displacement device and the mandrel proximal end of the mandrel when the mandrel is positioned within the outer shell; and
    the inner gas flow guide configured to guide the gas flowing from the gas displacement device to the mandrel backside.

6. The workpiece heating system of claim 5, further including:
    an annular outer gas flow guide configured to extend between the hood second wall and a proximal end of the heat exchanger; and the inner gas flow guide and the outer gas flow guide confining the gas flowing from the second annular gap to the heat exchanger.

7. The workpiece heating system of claim 5, further including:
an annular housing extension configured to extend between the gas displacement device and the hood first wall; and
the inner gas flow guide and the housing extension confining the gas flowing from the gas displacement device to the first annular gap.

8. The workpiece heating system of claim 1, wherein the hood system is configured to provide a spacing of up to 10 inches between:
the hood first wall and the mandrel backside; and
the hood second wall and the workpiece supported on the mandrel partside.

9. The workpiece heating system of claim 1, wherein:
the gas displacement device and the heat exchanger are mounted within the outer shell such that when the mandrel is positioned within the outer shell, the gas displacement device and the heat exchanger are each located axially below or aft of the mandrel proximal end.

10. The workpiece heating system of claim 1, wherein:
the outer shell comprises a first shell portion and a second shell portion configured to be mated to each other along a shell joint.

11. The workpiece heating system of claim 10, further including:
at least one mandrel support member fixedly coupled to the second shell portion and configured to support the mandrel when positioned within the outer shell.

12. A workpiece heating system for heating a workpiece supported on a generally cylindrical mandrel, comprising:
an outer shell including a first shell portion and a second shell portion configured to be mated along a circumferential shell joint for enclosing the mandrel removably positionable in an approximately vertical orientation within the outer shell, the mandrel having a mandrel proximal end, a mandrel distal end, a mandrel partside configured to support a workpiece, and a mandrel backside located radially inboard of the mandrel partside;
a gas displacement device mounted within the outer shell flush with or below the circumferential shell joint and having an outer circumferential exit configured to discharge a gas toward the mandrel backside;
a heat exchanger mounted within the outer shell below the gas displacement device and configured to heat the gas prior to entering the gas displacement device;
a hood system having a hood first wall and a hood second wall each configured to extend circumferentially in radially spaced relation to each other and in radially spaced relation respectively to the mandrel backside and the mandrel partside when the mandrel is positioned within the outer shell;
the hood first wall and the mandrel backside collectively defining a first annular gap configured to receive the gas discharged from the gas displacement device and direct the gas in a generally axial direction along a first flow path segment from the mandrel proximal end to the mandrel distal end; and
the hood second wall and the mandrel partside collectively defining a second annular gap configured to receive the gas from the first annular gap and direct the gas in a generally axial direction along a second flow path segment from the mandrel distal end to the mandrel proximal end.

13. A method of heating a workpiece supported on a mandrel, comprising:
positioning the mandrel within an outer shell, the mandrel having a mandrel proximal end, a mandrel distal end, a mandrel axis, a mandrel partside supporting a workpiece, and a mandrel backside opposite the mandrel partside;
heating the gas using a heat exchanger mounted within the outer shell;
discharging, using a gas displacement device mounted within the outer shell, a gas from the gas displacement device toward the mandrel backside;
directing, using a hood first wall of a hood system positioned over the mandrel, the gas from the gas displacement device in a generally axial direction through a first annular gap between the hood first wall and the mandrel backside along a first flow path segment extending from the mandrel proximal end to the mandrel distal end;
directing, using a hood second wall of the hood system, the gas from the first annular gap in a generally axial direction through a second annular gap between the hood second wall and the mandrel partside along a second flow path segment extending from the mandrel distal end to the mandrel proximal end; and
heating the mandrel in response to directing the gas through the first annular gap and the second annular gap and heating the workpiece in response to heating the mandrel.

14. The method of claim 13, wherein the steps of directing the gas through the first annular gap and directing the gas through the second annular gap respectively comprise:
directing the gas through the first annular gap located radially inboard of the mandrel; and
directing the gas through the second annular gap located radially outboard of the mandrel.

15. The method of claim 13, wherein the steps of directing the gas through the first annular gap and directing the gas through the second annular gap respectively comprise:
directing the gas through the first annular gap located radially outboard of the mandrel; and
directing the gas through the second annular gap located radially inboard of the mandrel.

16. The method of claim 13, wherein the step of directing the gas through the first annular gap comprises:
directing the gas through the first annular gap defined between the mandrel backside and the hood first wall comprising a mandrel circumferential wall attached to the mandrel backside.

17. The method of claim 13, further including:
maintaining, using an annular inner gas flow guide extending between a circumference of the gas displacement device and a circumference of the mandrel proximal end, separation between the gas flowing from the gas displacement device toward the first annular gap and the gas flowing in an opposite direction from the second annular gap toward the heat exchanger.

18. The method of claim 17, further including:
confining the gas between the inner gas flow guide and an annular outer gas flow guide extending from a circumference of a radially outermost one of the hood first wall and hood second wall, and a circumference of a proximal end of one of the gas displacement device and the heat exchanger located axially furthest from the mandrel proximal end.

19. The method of claim 17, further including:
confining the gas between the inner gas flow guide and an annular housing extension extending from one of the gas displacement device or heat exchanger and a proximal end of a radially innermost one of the hood first wall and hood second wall.

20. The method of claim 13, wherein the step of discharging the gas from the gas displacement device comprises:
discharging the gas from the gas displacement device located axially flush with or aft of the mandrel proximal end.

21. The method of claim 13, wherein the step of positioning the mandrel within the outer shell comprises:
mating a first shell portion to a second shell portion along a shell joint.

* * * * *